US010089534B2

(12) United States Patent
Shah et al.

(10) Patent No.: US 10,089,534 B2
(45) Date of Patent: Oct. 2, 2018

(54) EXTRACTING HIGH QUALITY IMAGES FROM A VIDEO

(71) Applicant: Adobe Systems Incorporated, San Jose, CA (US)

(72) Inventors: Abhishek Shah, Delhi (IN); Sagar Tandon, Ghaziabad (IN); Andaleeb Fatima, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 15/381,793

(22) Filed: Dec. 16, 2016

(65) Prior Publication Data
US 2018/0173959 A1    Jun. 21, 2018

(51) Int. Cl.
*H04N 9/80*     (2006.01)
*G06K 9/00*    (2006.01)
*G11B 27/031*  (2006.01)
*H04N 19/40*   (2014.01)

(52) U.S. Cl.
CPC ..... *G06K 9/00765* (2013.01); *G06K 9/00268* (2013.01); *G06K 9/00744* (2013.01); *G11B 27/031* (2013.01); *H04N 19/40* (2014.11)

(58) Field of Classification Search
CPC ........... G06K 9/00765; G06K 9/00268; G06K 9/00744; H04N 19/40; G11B 27/031

USPC ........................................................ 386/241
See application file for complete search history.

(56) References Cited

U.S. PATENT DOCUMENTS

| 2004/0227818 | A1* | 11/2004 | Wiedenberg | ........... H04N 7/183 348/207.1 |
| 2010/0104266 | A1* | 4/2010 | Yashiro | .............. G06K 9/00295 386/201 |
| 2011/0274407 | A1* | 11/2011 | Kogusuri | ............... H04N 5/145 386/230 |

* cited by examiner

*Primary Examiner* — Thai Tran
*Assistant Examiner* — Jose Mesa
(74) *Attorney, Agent, or Firm* — Wolfe-SBMC

(57) ABSTRACT

Various embodiments calculate a score for each frame of a video segment based on various subject-related factors associated with a subject (e.g., face or other object) captured in a frame relative to corresponding factors of the subject in other frames of the video segment. A highest-scoring frame from the video segment can then be extracted based on a comparison of the score of each frame of the video segment with the score of each other frame of the video segment, and the extracted frame can be transcoded as an image for display via a display device. The score calculation, extraction, and transcoding actions are performed automatically and without user intervention, which improves previous approaches that use a primarily manual, tedious, and time consuming approach.

20 Claims, 16 Drawing Sheets

EXTRACTING HIGH QUALITY IMAGES FROM A VIDEO

BACKGROUND

Conventional image capture techniques used to capture a perfect moment is difficult with moving subjects or commotion in a scene. Because of this difficulty, some users have shifted to videography to record a video of a long duration event and then manually sift through the video to extract frames of interest. Using this lengthy manual process can be a useful alternative to candid photography, where capturing the perfect moment requires near perfect timing and presence of mind on the part of the photographer.

Challenges arise when sharing videos versus images. Video files are generally larger files than image files, and require relatively more bandwidth and time to share via a network, such as by uploading to a social media website. Thus, users in general tend to upload image files to social media websites more frequently than video files. Although image files are more easily and more quickly uploaded, it is the constantly recording video that can capture fleeting moments commonly missed when using a still camera that only takes photographs.

Capturing or otherwise obtaining still images of those fleeting moments for sharing via social media or other content-sharing platform is challenging because conventional techniques for obtaining such still images are tedious and time consuming manual processes.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Various embodiments calculate a score for each frame of a video segment based on various subject-related factors associated with a subject (e.g., face or other object) captured in a frame relative to corresponding factors of the subject in other frames of the video segment. A highest-scoring frame from the video segment can then be extracted based on a comparison of the score of each frame of the video segment with the score of each other frame of the video segment, and the extracted frame can be transcoded as an image for display via a display device.

The techniques described herein improve upon the traditional approach that uses primarily manual, tedious, and time consuming techniques by automatically and without user intervention identifying a best image from a video segment. This enables a user to capture fleeting moments that are easily missed when using a still camera, and then quickly and easily obtain a "best" image from each video segment.

BRIEF DESCRIPTION OF THE DRAWINGS

The detailed description is described with reference to the accompanying figures.

DETAILED DESCRIPTION

Overview

Figure 1:
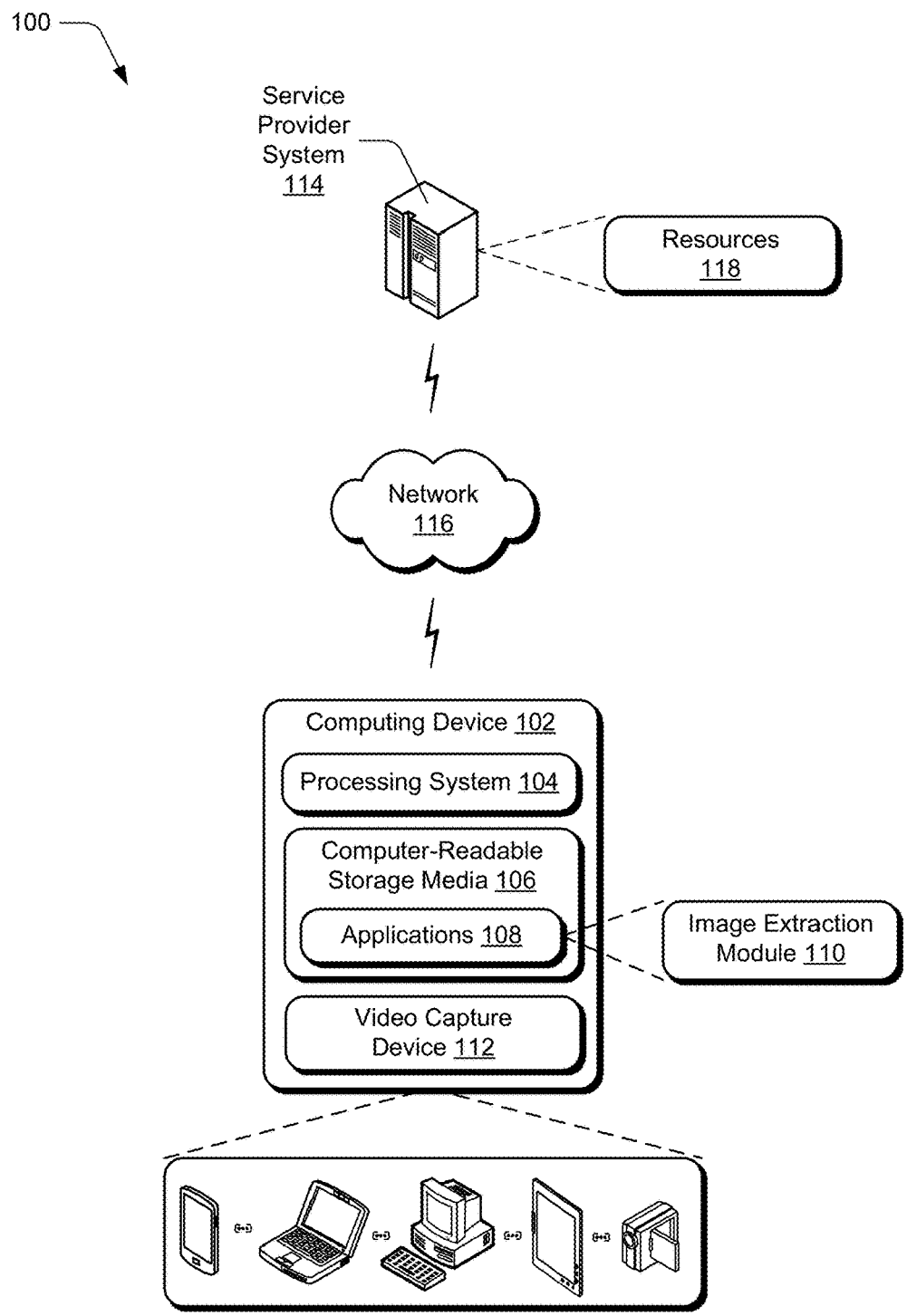
FIG. 1 is an illustration of a digital medium environment in an example implementation that is operable to employ techniques described herein.

Capturing fleeting moments with a still camera is challenging, and requires near perfect timing and presence of mind on the part of the photographer. Capturing those same fleeting moments with a video is much easier, but video files are large and consume large amounts of bandwidth when transmitting via a network. Capturing the video and then extracting images from the video to transmit via the network is not trivial, and generally requires a tedious and time consuming manual process of browsing through the video frame by frame to find frames that are high quality, such as a well-focused and appropriately zoomed frame with the subject's eyes open and facing the camera. Finding such a high quality frame from among all the frames in the video is a burdensome and undesirable task using these conventional techniques.

Accordingly, techniques are described in the following for extracting high quality images from videos. These techniques identify subjects (e.g., faces and other image objects) in a video and their correlation with each other and with the scene or background. The video is first divided into segments that are bounded by scene changes, or changes to a number of faces or other objects in the scene. These segments are then merged to create merged segments that each contain a different type of content than the other merged segments. Scores are then calculated for each frame of a merged segment based on a variety of different factors relative to other frames in the video segment. Some example factors include zoom, alignment of faces, open eyes, overlap of faces, motion, and orientation of faces. Other factors are also contemplated, such as a number of faces or other objects, smile or emotion of each face, camera shake, blurriness, brightness, contrast, and so on. Each frame of the merged segment is assigned an overall score based on the scores associated with each factor. Then, a highest-scoring frame is extracted and transcoded as an image for display via a display device.

In an example implementation, a user capturing a video of a group of people gathering together for a group shot can simply record the video. By recording the video, those perfect moments are captured when all the people in the group have their eyes open, are smiling, are aligned together, are not overlapping each other, and are well-focused. Subsequently, the video is analyzed using the techniques described herein, and a high quality image for each different portion of the video is quickly and automatically presented to the user without requiring input from the user. Using these techniques, the user can easily capture high quality images of fleeting moments that are ready and available to share, such as by uploading to a social media site or by transmitting an email or text to a friend.

As used herein, the term "object" (also referred to herein as "image object") is representative of a material article that is depicted in an image, such as in a key frame of video data. The object can include an item, a device, a gadget, an entity, a person, an animal, a plant, and so on. In implementations, the object can include a face of a person depicted in an image. Thus, the term "object" can represent any of a variety of objects in images or in video data.

As used herein, the term "subject" refers to a primary object captured in an image or video, such as the primary object on which a photographer or videographer focuses. The subject can include any of a variety of different objects, such as those described above captured in the image or the video.

As used herein, the term "face change" refers to a change to a number of faces in a scene. For example, in a video including six people, one or more of those people may exit the frame, or become hidden behind an object such as another person in the frame. Thus, the face change represents a moment in the video when the number of faces in one frame changes to a different number of faces in a next frame. Similarly, the term "object change" may refer to a change to a number of objects other than faces in the scene from one frame to the next frame. Further, the term "scene change" may refer to a change to a background scenery. For example, in a video of people in standing together in a room, a scene change may occur when the camera turns to record a different area of the room, or may move to a different room. Alternatively, the scene can jump to a different background setting, such as a garden, a driveway, or a different building with different people. In implementations, a black screen can indicate an ending to a scene and/or a beginning of a next scene. Accordingly, the scene change represents a wide variety of different changes to background settings or scenery.

As used herein, the term "face segment" represents a segment of video (e.g., multiple consecutive frames) bounded on either side by a face change. Similarly, the term "object segment" represents a segment of video bounded on either side by an object change. Likewise, the term "scene segment" represents a segment of video bounded on either side by a scene change.

In the following discussion, an example digital medium environment is first described that can employ the techniques described herein. Example implementation details and procedures are then described which can be performed in the example digital medium environment as well as other environments. Consequently, performance of the example procedures is not limited to the example environment and the example environment is not limited to performance of the example procedures. Finally, an example system and device are described that are operable to use the techniques and systems described herein in accordance with one or more implementations.

Example Digital Medium Environment

FIG. 1 is an illustration of a digital medium environment 100 in an example implementation that is operable to utilize techniques for extracting high quality images from videos. As used herein, the term "digital medium environment" refers to the various computing devices and resources that can be utilized to implement the techniques described herein. The illustrated digital medium environment 100 includes a computing device 102 including a processing system 104 that includes one or more processing devices, one or more computer-readable storage media 106, and various applications 108 embodied on the computer-readable storage media 106 and operable via the processing system 104 to implement corresponding functionality described herein.

In at least some implementations, the applications 108 include or otherwise make use of an image extraction module 110. In some implementations, the image extraction module 110 is a standalone application. In other implementations, the image extraction module 110 is included as part of another application or system software such as a computing device's operating system. The image extraction module 110 is configured to automatically identify and extract high quality images from videos based on subject-related factors determined by applying one or more sets of rules to various frames of the videos. The image extraction module 110 is also configured to transcode extracted images for display via a display device of the computing device as described above and below.

This constitutes an improvement over current approaches which use a primarily manual approach to identify and select images for extraction. The automated nature of the described implementations provides a fast, efficient, and easily scalable solution, as discussed below in more detail.

The computing device 102 can also include a video capture device 112 that enables an end user to capture and record live-motion video and audio for later playback. The video capture device 112 can include any of a wide variety of devices, such as a camera phone, a digital camera, a webcam, and so on. Generally, the video capture device 112 records video in one of a variety of different formats, including MP4. In some implementations, the video capture device 112 includes one or more of the applications 108, such as video editing applications, and/or the image extraction module 110.

The computing device 102 may be configured as any suitable type of computing device. For example, the computing device may be configured as a desktop computer, a laptop computer, a television, a mobile device (e.g., assuming a handheld configuration such as a tablet or mobile phone), a tablet, a camera, a portable video camera recorder ("camcorder"), and so forth. Additionally, although a single computing device 102 is shown, the computing device 102 may be representative of a plurality of different devices to perform operations "over the cloud" as further described in relation to FIG. 14.

The digital medium environment 100 further depicts one or more service provider systems 114, configured to communicate with the computing device 102 over a network 116, such as the Internet, to provide a "cloud-based" computing environment. Generally speaking, a service provider system 114 is configured to make various resources 118 available over the network 116 to clients. In some scenarios, users may sign up for accounts that are utilized to access corresponding resources, such as images or video, from a provider. The provider may authenticate credentials of a user (e.g., username and password) before granting access to an account and corresponding resources 118. Other resources 118 may be made freely available, (e.g., without authentication or account-based access). The resources 118 can include any suitable combination of services and/or content typically made available over a network by one or more providers. Some examples of services include, but are not limited to, a social networking service, a messaging service, and so forth. Content may include various combinations of assets, video comprising part of an asset, audio, multi-media streams, animations, images, web documents, web pages, applications, device applications, and the like.

Although the network 116 is illustrated as the Internet, the network may assume a wide variety of configurations. For example, the network 116 may include a wide area network (WAN), a local area network (LAN), a wireless network, a public telephone network, an intranet, and so on. Further, although a single network 116 is shown, the network 116 may be representative of multiple networks.

Various types of input devices and input instrumentalities can be used to provide input to computing device 102. For example, the computing device can recognize input as being a mouse input, stylus input, touch input, input provided through a natural user interface, keyboard input, button actuation input, and the like. Thus, the computing device can recognize multiple types of gestures including touch gestures and gestures provided through a natural user interface.

Example Image Extraction Module

Figure 2:
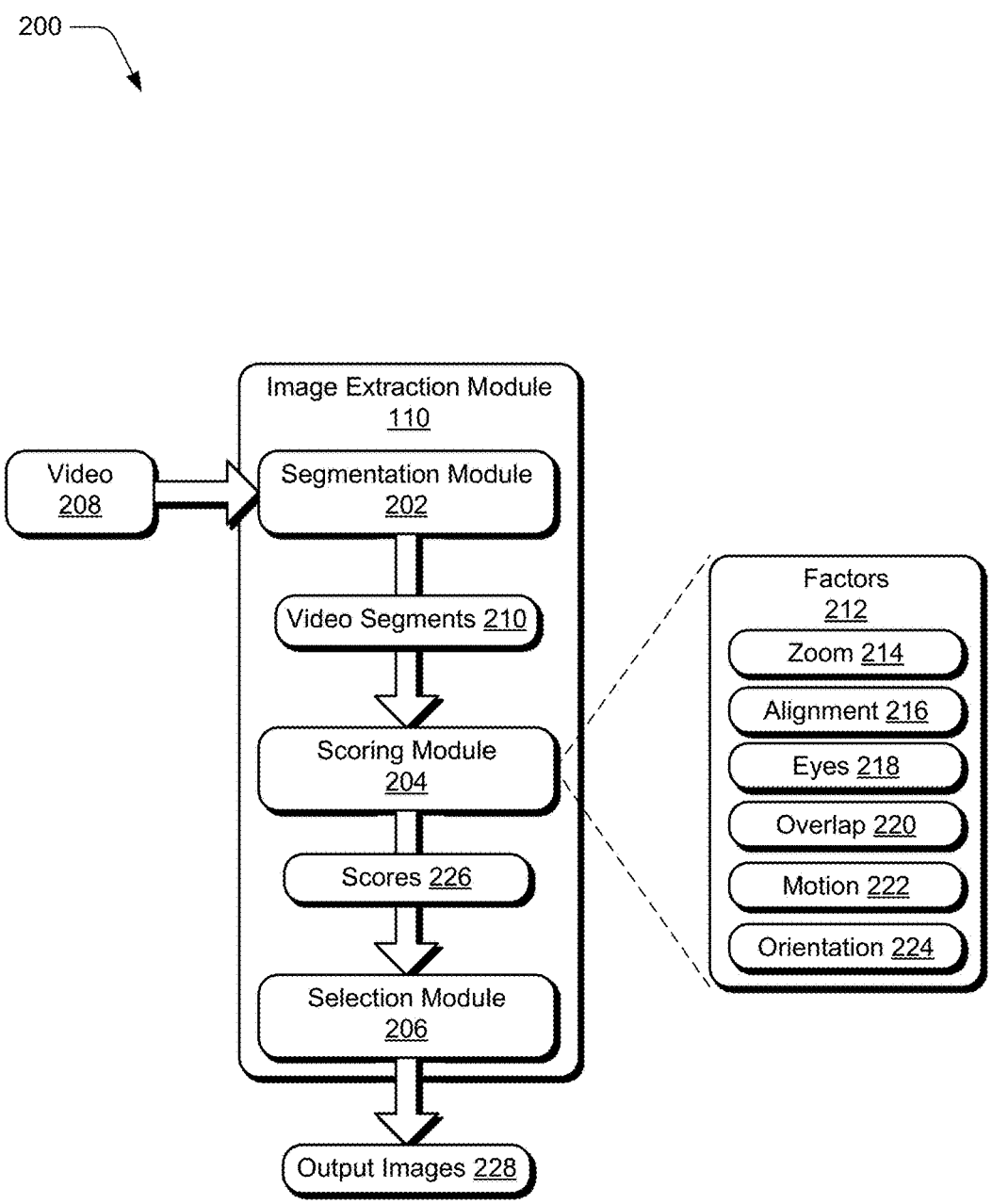
FIG. 2 illustrates an example image extraction module in accordance with one or more implementations.

FIG. 2 illustrates an example image extraction module 110 in accordance with one or more implementations. The image extraction module 110 is illustrated as including a segmentation module 202, a scoring module 204, and a selection module 206. These modules can be implemented in any suitable hardware, software, firmware, or combination thereof.

The segmentation module 202 is representative of functionality, and constitutes but one means, that analyzes a video 208, such as a video file, and divides the video 208 into a plurality of video segments 210. In some implementations, the segmentation module 202 divides the video 208 into video segments 210 based on one or more scene changes. Alternatively, the video 208 can be divided based on object changes in the video, such as a change in a number of objects. Further, the video 208 can be divided more particularly based on face changes in the video, such as a change in a number of faces. In at least some implementations, the segmentation module 202 utilizes a combination of scene changes, object changes, and/or face changes to divide the video 208 into the video segments 210.

The scoring module 204 represents functionality to apply a set of rules to each frame of each video segment 210 to calculate, for each frame, a set of scores corresponding to different factors 212. Some example factors 212 include zoom 214, alignment 216, eyes 218, overlap 220, motion 222, and orientation 224, each of which are described below in more detail. Using the set of scores, the scoring module 204 assigns an overall score to each frame, where the overall score represents an overall level of image quality of the frame based on the factors 212.

The zoom 214 factor indicates whether a magnification level of objects (e.g., faces), is changed from a frame to a next frame, such as to exclude one or more of the objects or to include one or more additional objects. The alignment 216 factor represents a measure of a distance between the objects in the frame. If the frame includes faces, the eyes 218 factor indicates whether the eyes of those faces are open. The overlap 220 factor represents a measure of objects overlapping one or more other objects in the frame. The motion 222 factor represents a level of activity occurring in the frame, which indicates a an amount of image blur. The orientation 224 factor indicates a measure of divergence between respective orientations of objects in the frame. Additional factors that can be calculated and used to assign corresponding scores include factors based on area occupied by objects in the frame, the number of objects in the frame, an emotion or smile of each face in the frame, camera shake, blurriness, brightness and contrast, and so on. Accordingly, any of a variety of different factors can be detected, analyzed, and used to assign scores to each frame of the video segment 210. These and other factors are described in further detail below.

After the scoring module 204 generates scores for the frames in each video segment 210, the selection module 206 analyzes the scores 226 to identify and select a highest-scoring frame in each video segment 210. The highest-scoring frame in each video segment 210 is then transcoded as an output image 228 for display via a display device.

Figure 3:
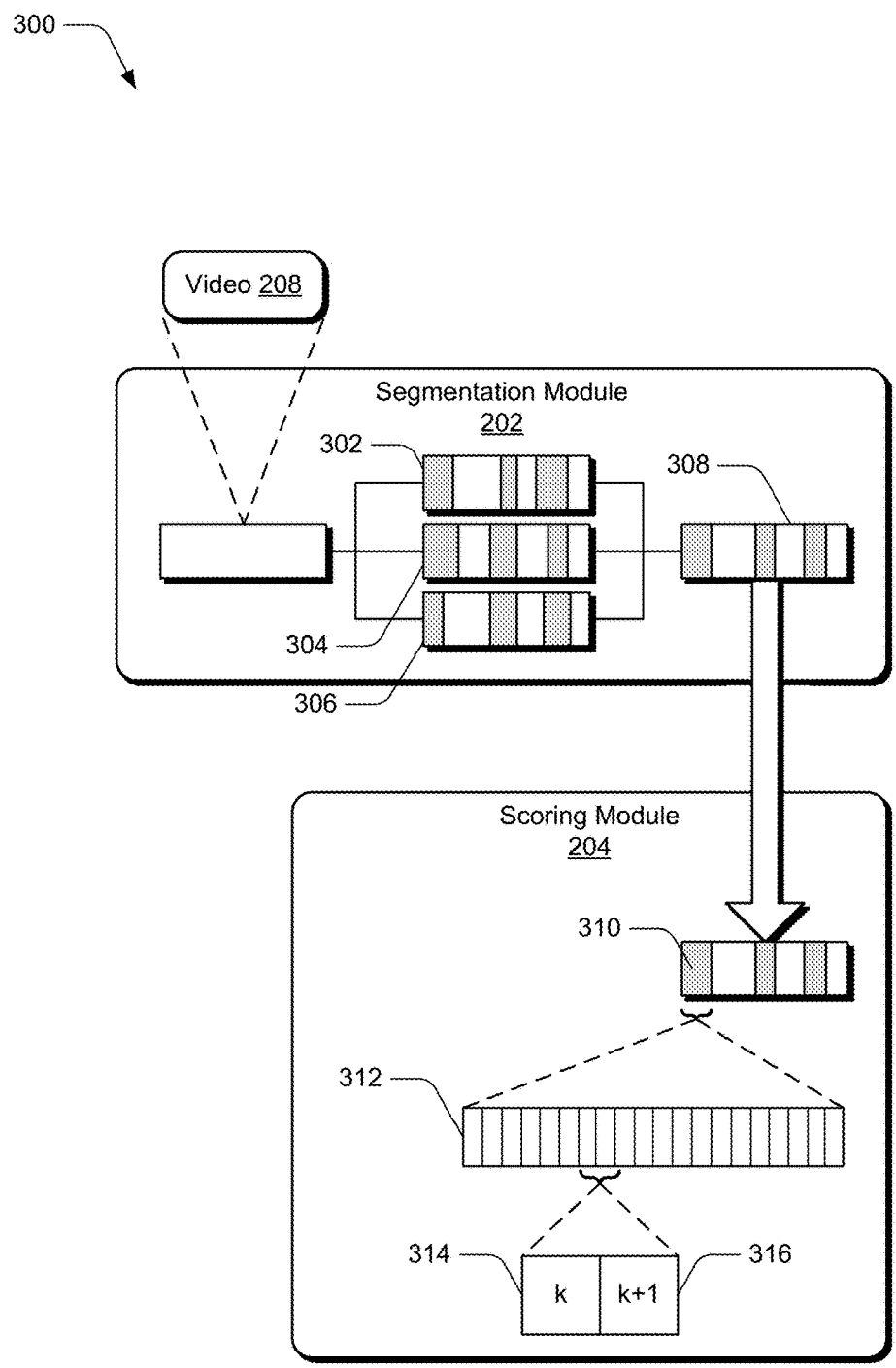
FIG. 3 illustrates an example implementation of video segmentation in accordance with one or more embodiments.

FIG. 3 illustrates an example implementation 300 of video segmentation in accordance with one or more embodiments. In the illustrated implementation 300, the segmentation module 202 analyzes the video 208 to identify and locate scene changes. The segmentation module 202 then divides the video 208 into segments using the scene changes as boundaries for each segment. In this way, the segmentation module 202 generates scene segments 302 representing video segments bounded by scene changes.

Using object detection techniques, object information indicating a number of objects in each frame is determined by the segmentation module 202. The object information is then used to identify and locate frames where the number of objects changes relative to a previous or next frame. These located frames can be used as boundaries to divide the video 208 into object segments 304 representing video segments bounded by object changes. This process can be repeated using more specific face detection techniques, such as facial recognition systems, to obtain face information indicating a number of faces in each frame. Using the face information, the segmentation module 202 identifies and locates frames where the number of faces changes relative to a previous or next frame. Then, the segmentation module 202 generates face segments 306 representing video segments bounded by face changes.

In at least some implementations, the segmentation module 202 determines which frames to use as boundaries for each of the scene segments 302, object segments 304, and face segments 306 without generating copies of the video 208. Rather, the segmentation module 202 identifies the frames for the different boundaries and uses this information to analyze different groups of frames according to a particular type of boundary, e.g., scene, object, or face boundary. Subsequently, the segmentation module 202 merges the scene segments 302, object segments 304, and face segments 306 to provide a set of merged segments 308 that each include different content in comparison to one another. The set of merged segments 308 is representative of the video segments 210 in FIG. 2.

The scoring module 204 evaluates each of the merged segments 308, such as merged segment 310 having a plurality of frames 312, and analyzes the frames 312 of the merged segment 310 relative to one another. Then, the scoring module 204 calculates and assigns scores for each individual frame of the merged segment 310. For example, the scoring module 204 can determine scores for frame k 314 and frame k+1 316 based on a number of different factors, such as the factors 212 described in FIG. 2. Each score for frame k 314 represents a different factor 212 relative to a corresponding factor in frame k+1 316. The scoring module 204 then calculates an overall score for each frame in the merged segment 310. The overall score includes a value representing an overall level of image quality of the frame relative to the other frames in the merged segment 310 based on the scores of the factors 212 for the frame. The overall score includes a weighted mean of the scores of the factors 212. The weights can initially be equal, but machine learning can be utilized to learn and improvise the weights. Also, a user can customize the weights based on one or more requirements. Based on an overall score for each frame, a highest-scoring frame is selected, extracted, and transcoded as an image.

As mentioned above, the scores for each frame are based on a variety of different factors 212 that are related to the subject (e.g., person or other image object) captured in each frame. Consider now a discussion of the example factors 212 and techniques for determining scores based on each factor 212 in relation to FIGS. 4-10. In the discussion below, various example algorithms are discussed in relation to faces identified in the video frames. This is not to be construed as limiting, and the example algorithms discussed below can also be applied to any of a variety of different objects identified in the frames.

For purposes of the discussion below, let each frame number k in merged segment $M_i$ be denoted as $Fr_k$. For each frame $Fr_k$, let the faces in the frame $Fr_k$ be denoted by $f_{yk}$, where y is a value representing a particular face. Further, let the center of each of the faces $f_{yk}$ in the frame $Fr_k$ be denoted as $c_{yk}$. Additionally, let the area of each face $f_{yk}$ be denoted as $a_{yk}$.

Figure 4:
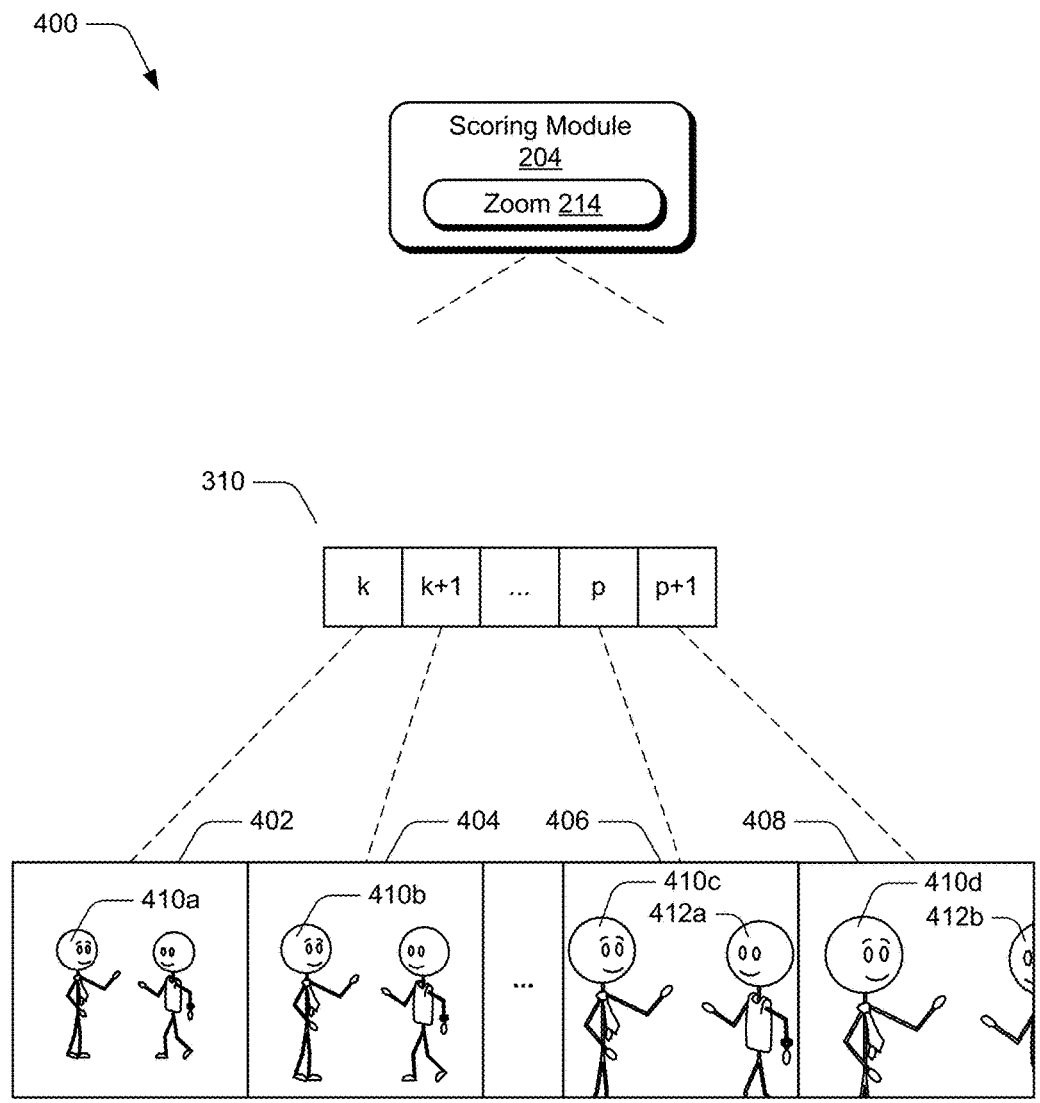
FIG. 4 illustrates an example implementation of a scoring module configured to score frames based on a zoom factor in accordance with one or more embodiments.

FIG. 4 illustrates an example implementation 400 of the scoring module 204 scoring frames based on the zoom 214 factor in accordance with one or more embodiments. In an example scenario, a videographer may zoom in or zoom out over faces in an attempt to capture the best shot possible. In this example scenario, the videographer may continue zooming in or out until he is satisfied that the best shot has been captured. Based on this, the scoring module 204 determines whether zooming in or out is occurring on faces in the merged segment 310.

Below is an example zoom score algorithm applied by the scoring module 204 to calculate a zoom-in score for each frame in the merged segment:
  i. Iterate on each frame $Fr_k$ of the merged segment $M_j$. Start with frame k.
  ii. Consider two consecutive frames $Fr_k$ and $Fr_{k+1}$.
  iii. Check if:
    a. Number of faces in both frames $Fr_k$ and $Fr_{k+1}$ are the same
    b. For each face $f_{yk}$ in $Fr_k$ find corresponding face $f_{y(k+1)}$ in $Fr_{k+1}$ such that the centers $c_{yk}$ of these two faces are at approximately same relative position.
    c. The area of each face $f_{yk}$ in $Fr_k$ is less than its corresponding face $f_{y(k+1)}$ in $Fr_{k+1}$.
  iv. If all conditions in step iii are satisfied, then repeat step iii for at least next two consecutive frames (e.g., frames $Fr_{k+1}$ and $Fr_{k+2}$) until reaching a frame $Fr_p$ for which the conditions in step iii are not satisfied. Then, the frames from $Fr_k$ to $Fr_p$ are determined to have an increasing level of magnification (e.g., zoom in).
  v. Repeat steps i-iv for remaining segments $M_{i+1}$ through $M_{i+n}$.

In the example zoom score algorithm above, the frame $Fr_p$ indicates an end boundary for a group of frames from $Fr_k$ to $Fr_p$. In this group of frames, the frame $Fr_p$ is assigned the highest relative zoom-in score because the zoom 214 is at its maximum relative to the other frames in the group, where the number of faces is the same in the frames from $Fr_k$ to $Fr_p$, and the centers of the faces in frame of the group are each at approximately the same relative position. A similar process is performed for calculating a zoom-out score for each frame in the merged segment 310, except that step iii(c) checks if the area $a_{yk}$ of each face $f_{yk}$ is greater than the area $a_{y(k+1)}$ its corresponding face $f_{y(k+1)}$ in $Fr_{k+1}$.

In the illustrated example, the merged segment 310 includes frames 402, 404, 406, and 408, which represent frames $Fr_k$, $Fr_{k+1}$, $Fr_p$, and $Fr_{p+1}$, respectively. The frame 402 includes two subjects facing each other. Applying the above set of rules to the frame 402 and the next frame 404 in the segment yields results indicating that the camera is zooming in to the subjects because the area of face 410a in frame 402 is less than the area of the corresponding face 410b in the next frame 404. In addition, the next frame 404 includes the same number of faces as that of the frame 402. Consequently, the next frame 404 is assigned a relatively higher zoom score in comparison to the frame 402. Consecutive frames in the merged segment 310 are analyzed in this manner until reaching a frame p, e.g., frame 406. When the scoring module 204 applies the above rules to frame 406 and subsequent frame 408, the conditions in step iii are not all satisfied. For instance, the frame 406 does not include the same number of faces as the frame 408 because the camera has zoomed in on the subjects beyond the point at which both subjects can remain in the frame. For example, the frame 406 includes both face 410c and 412a. However, in the frame 408, the camera has zoomed in to face 410d effective to cut at least a portion of the other face 412b out of the frame 408. In this implementation, frame 406 is assigned the highest zoom score relative to the other frames 402, 404, and 408 in the merged segment 310.

Use of the rule sets constitutes an improvement over current approaches that use a primarily manual approach to identify and extract images from video. The automated nature of the described implementations provides a fast, efficient, and easily scalable solution. That is, through the use of automated rules of the particular types described herein, high quality images can be more quickly and efficiently identified and extracted from video. Moreover, the automated rules promote scalability by removing the need for human intervention, such as additional humans to perform an arduous manual process.

Figure 5:
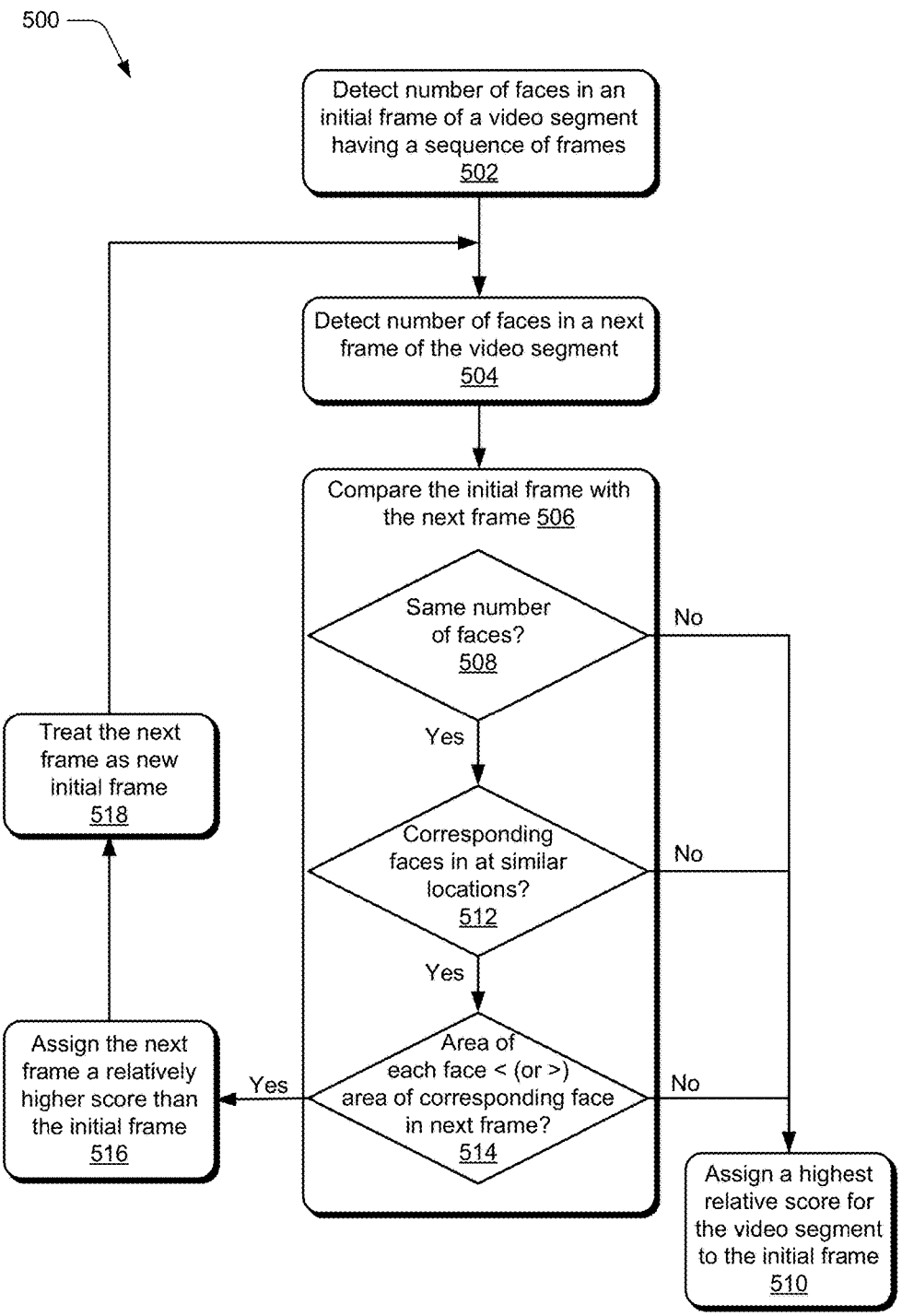
FIG. 5 depicts a flow diagram of an example procedure for scoring frames based on the zoom score algorithm in accordance with one or more embodiments.

FIG. 5 depicts a flow diagram of an example procedure 500 for scoring frames based on the zoom score algorithm in accordance with one or more embodiments. Aspects of the procedure may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed in a digital medium environment by a suitably configured device, such as the example computing device 102 described with respect to FIG. 1.

At 502, a number of faces are detected in an initial frame of a video segment having a sequence of frames. At 504, a number of faces in a next frame of the video segment is detected. These operations can be performed in any suitable way. For example, in one or more implementations, a face detection engine can be utilized to identify and locate faces of subjects in the initial and next frames of the video segment. The face detection engine provides information usable to determine an area of each face, a center of each face, and a location of the center of each face within the frame. The information detected by the face detection engine can also include relative position, size and/or shape of the eyes, nose, cheekbones, and jaw. Accordingly, a variety of distinctive features of a face can be detected by the face detection engine At 506, the initial frame and the next frame are compared. For example, at 508, a determination is made as to whether the initial frame and the next frame have the same number of faces. If the next frame does not have the same number of frames as the initial frame, then the comparison ends at 510 and the initial frame is assigned the highest relative score for the zoom 214 factor for the video segment. If, however, the number of faces is the same in both the initial frame and the next frame (e.g., "YES"), then at 512 a determination is made as to whether the center of each face in the initial frame is at a same approximate relative position as the center of each corresponding face in the next frame. If the center of a face in the initial frame is located at a substantially different location than the center of a corresponding face in the next frame, then the comparison ends at 510 and the initial frame is assigned the highest relative score for the video segment. If, however, the centers of corresponding faces in the initial frame and the next frame are located at similar relative positions, then the comparison continues to 514.

At 514, a determination is made as to whether an area of each face in the initial frame is less than (for zooming in), or greater than (for zooming in), the area of each corresponding face in the next frame. For example, if a face in the initial frame has a relatively smaller area compared with that of the same face in the next frame, such that the face in the next frame appears larger in comparison to the face in the initial frame, then it is determined that the video is zooming in. Alternatively, if the face in the initial frame has a relatively larger area than that of the corresponding face in the next frame, then it is determined that the video is zooming out. If the respective areas are the same, however, then it is determined that zooming has ceased (e.g., "NO"). If zooming has ceased, then the comparison ends and at 510 the initial frame is assigned the highest relative score for the video segment.

If conditions are satisfied at 514 (e.g., "YES"), then at 516 the next frame is assigned a relatively higher score than the initial frame. This higher score indicates a higher level of zoom in (or zoom out) in comparison to the initial frame. Then, at 518, the next frame is treated as a new initial frame and compared with a next consecutive frame in the video segment. This process continues to analyze and compare each pair of consecutive frames in the video segment until one or more of the conditions described in 508-510 are not satisfied. Each frame in the video segment is assigned a different score based on the zoom factor, also referred to as a zoom score.

Figure 6:
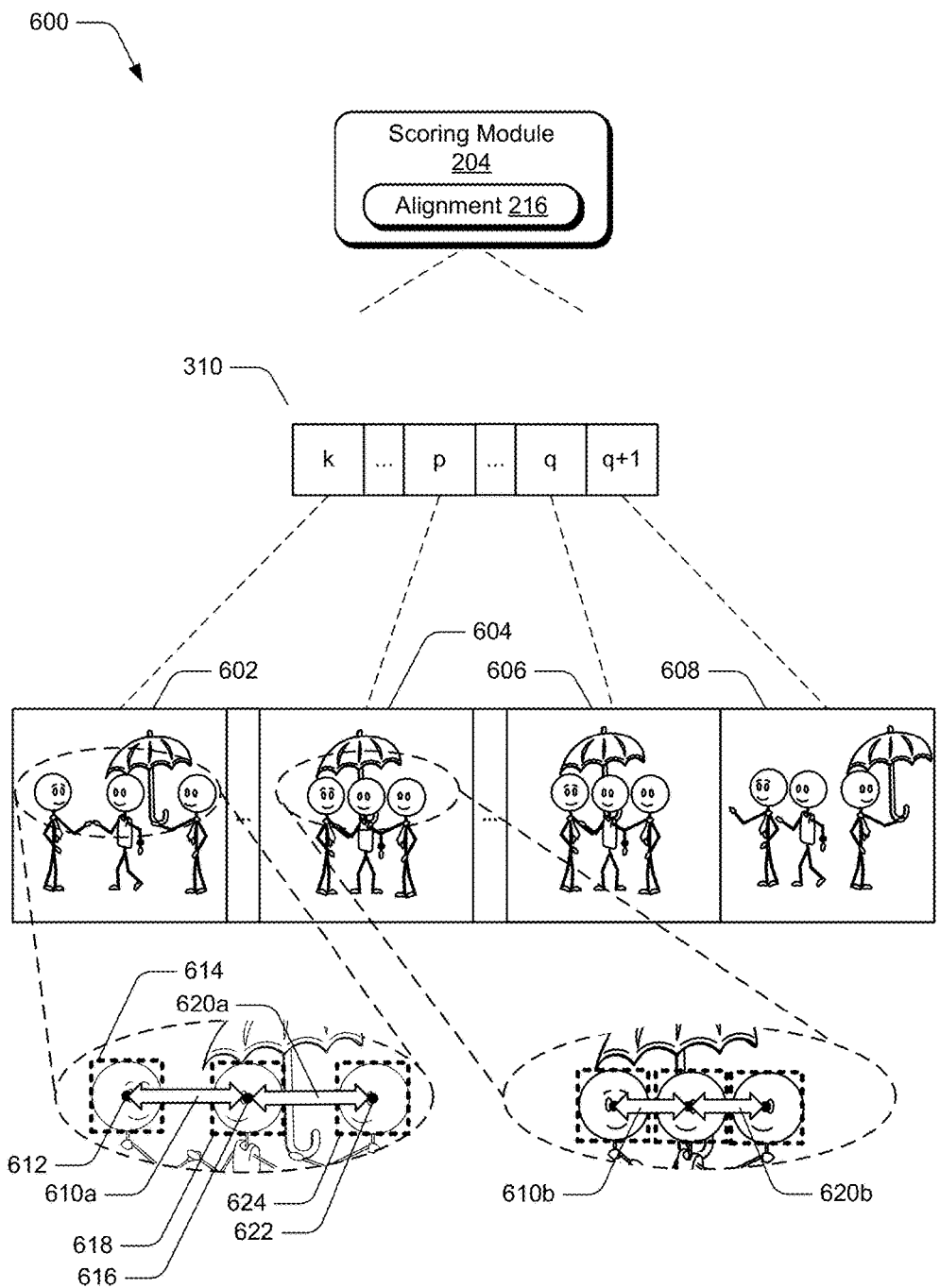
FIG. 6 illustrates an example implementation of the scoring module configured to score frames based on an alignment factor in accordance with one or more embodiments.

FIG. 6 illustrates an example implementation 600 of the scoring module 204 scoring frames based on the alignment 216 factor in accordance with one or more embodiments. In an example scenario, a video captures multiple subjects walking towards each other from different parts of the frame area and coming together for some seconds near one another to form a group for a group picture. The scoring module 204 analyzes the video to automatically identify this type of scenario and assigns scores to frames based on the alignment 216 of the subjects in the frame. Below is an example alignment score algorithm applied by the scoring module 204 to calculate an alignment score for each frame in the merged segment 310 based on the subjects aligning together:

i. Iterate on each frame $Fr_k$ of the merged segment $M_i$. Start with frame k.
ii. Consider two consecutive frames $Fr_k$ and $Fr_{k+1}$.
iii. Check if number of faces in both frames $Fr_k$ and $Fr_{k+1}$ are the same. If the number of faces are the same, then continue, else go to start and begin from next frame.
iv. For frame $Fr_k$, find variance $Vr_k$ based on the center $c_{yk}$ of each face $f_{yk}$.
v. For frame $Fr_{k+1}$, find variance $Vr_{k+1}$ based on the center $c_{y(k+1)}$ of each face $f_{y(k+1)}$.
vi. Check if $Vr_k > Vr_{k+1}$
vii. If condition in step vi is satisfied, then move further until finding a frame p for which $Vr_{p-1} \sim Vr_p$ and it is stable at this value for at least next two frames until frame q, where $Vr_q < Vr_{q+1}$, so region ends at $Vr_q$.
viii. Assign frames in region beginning at $Fr_p$ and ending at $Fr_q$ a highest relative score for the alignment factor in the merged segment $M_i$. Other frames previous to frame p and after frame q are assigned a lower relative score for the alignment factor.
ix. Repeat steps i-viii for remaining segments $M_{i+1}$ through $M_{i+n}$.

In the example alignment score algorithm above, the variance represents distances between the centers of the faces in the frame. In addition, the frame $Fr_q$ represents an end boundary for a region of frames from $Fr_p$ to $Fr_q$. In this region of frames, the frames from $Fr_p$ to $Fr_q$ are assigned the highest relative alignment score because those frames include the subjects aligned together for the group shot. The variance is lowest when the subjects are near one another for the group shot. Thus, lower variance frames are assigned higher alignment scores.

In the illustrated example, the merged segment 310 includes three subjects moving towards one another, settling into a group for a period of time (e.g., several frames of the video segment), and then moving away from one another. Example frames 602, 604, 606, and 608 are illustrated as sample frames from the merged segment 310. The variance of frame 602 is based on distances between the centers of the faces in the frame 602, such as distance 610a between center 612 of face 614 and center 616 of face 618. The variance also incorporates distance 620a between the center 616 of face 618 and center 622 of face 624. The variance of frame 602 is compared with the variance of the next frame 604 to determine whether the subjects (e.g., faces) are gathering together. In the illustrated example, the distances 610a, 620a in frame 602 are relatively greater than corresponding distances 610b, 620b in frame 604. The variance can represent the distances between the centers of all the faces in the frame. Here, the variance of the frame 604 is lower than the variance of the frame 602.

In the illustrated example, the subjects hold their approximate positions from frame 604 to frame 606, and this is determined because respective variances of the frames between and including frame 604 and frame 606 are approximately the same. Notice, however, that the subjects in frame 608 are moving away from each other because the group shot has finished. Because of this movement, the variance of frame 608 is relatively larger than the variance of frame 606, and this difference in relative variance is used as an indication of an end boundary of the region of frames having the group shot. Accordingly, the frames in the region from frame 604 to frame 606 are assigned higher scores in comparison to other frames in the merged segment 310.

Figure 7:
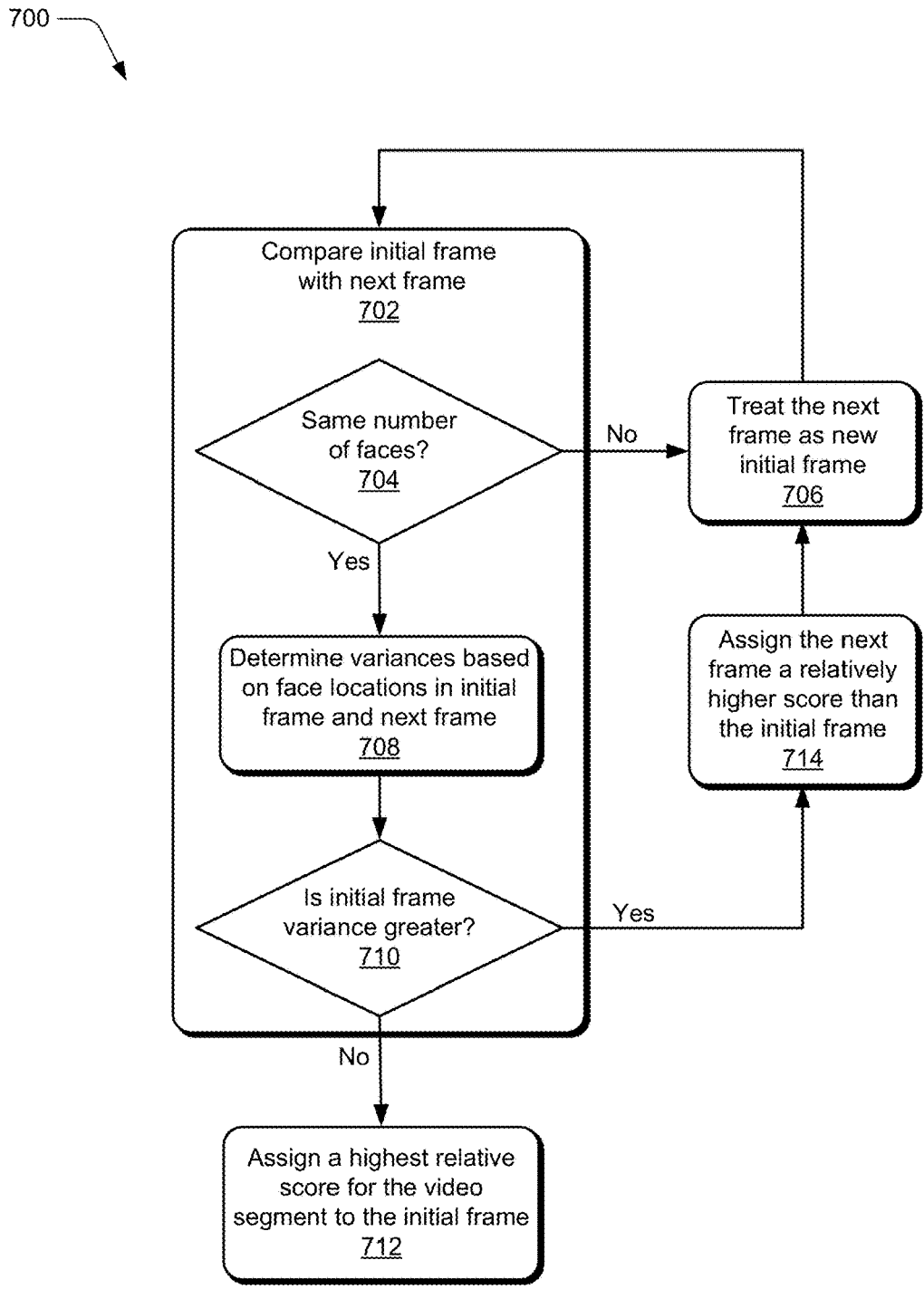
FIG. 7 depicts a flow diagram of an example procedure for scoring frames based on the alignment score algorithm in accordance with one or more embodiments.

FIG. 7 depicts a flow diagram of an example procedure 500 for scoring frames based on the alignment score algorithm in accordance with one or more embodiments. Aspects of the procedure may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures may be performed in a digital medium environment by a suitably configured device, such as the example computing device 102 described with respect to FIG. 1.

At 702, an initial frame is compared with a next frame in a sequence of frames in a video segment. At 704, it is determined by the scoring module 204 whether a number of faces in both the initial frame and the next frame are the same. If the number of faces is not the same (e.g., "NO"), then the next frame is treated as a new initial frame and the process restarts at 702 to compare the new initial frame with a new next frame. If the number of faces is the same in both the initial frame and the next frame (e.g., "YES"), then at 708 a variance is determined for each of the initial and next frames based on distances between the centers of each face. At 710, the scoring module 204 determines whether the variance of the initial frame is greater than the variance of the next frame. If so (e.g., "YES"), then at 714 the next frame is assigned a relatively higher score than the initial frame, at 706 the next frame is treated as the new initial frame, and the process continues at 702 by comparing the new initial frame with a new next frame. If the variance of the initial frame is not greater than the variance of the next frame (e.g., "NO"), then at 712 the initial frame is assigned a highest relative alignment score for the video segment and the process ends. In this way, each frame in the video segment may be assigned a different alignment score based on the alignment factor.

Figure 8:
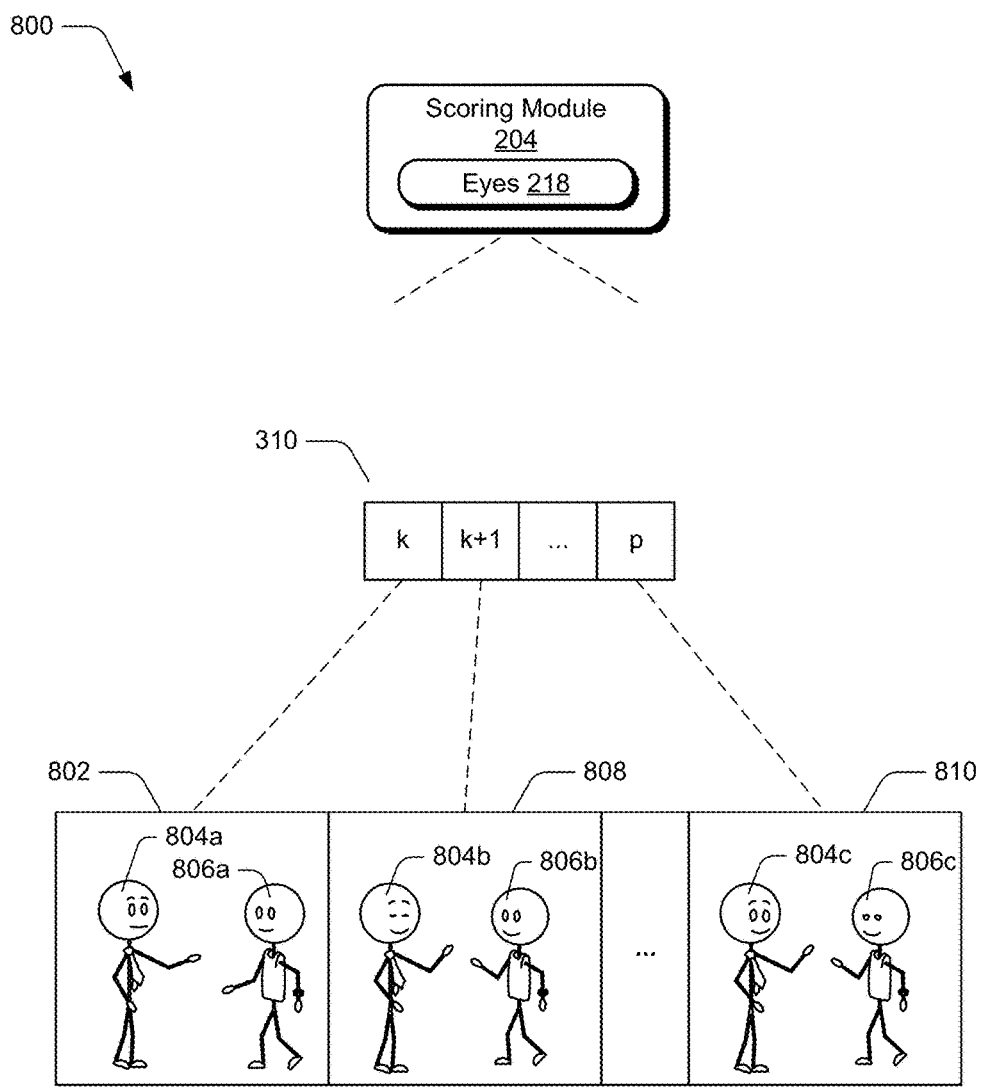
FIG. 8 illustrates an example implementation of the scoring module configured to score frames based on an eyes factor in accordance with one or more embodiments.

FIG. 8 illustrates an example implementation 800 of the scoring module 204 scoring frames based on the eyes 218 factor in accordance with one or more embodiments. Capturing group photos can be challenging because different people blink their eyes at different rates. Consequently, many frames of captured video can include one or more persons having their eyes open while another person's eyes are closed or partially open. A photographer generally captures multiple photos of a group of people in an attempt to capture at least one shot with everyone's eyes open. This can be frustrating for the photographer and also for the people being photographed.

In the illustrated implementation 800, the merged segment 310 includes two people facing one another. In frame 802, face 804a and face 806a both have eyes open. In frame 808, face 804b has eyes closed because he is blinking, while face 806b has eyes open. In frame 810, face 804c has eyes open while face 806b has eyes partially open. In this example, the scoring module 204 assigns frame 802 a relatively higher score than frames 808, 810 because both faces 804a, 806a have their eyes completely open. The frames 808, 810 are assigned relatively lower scores because of at least one face in each frame that has eyes closed or only partially open.

The image extraction module 110 determines, for each frame of a merged segment, whether the eyes of each subject in the frame are open, closed, or partially open. Eye information is then analyzed by the scoring module 204 to assign scores to each frame. An example eyes score algorithm applied by the scoring module 204 includes:
  i. Iterate on each frame of the merged segment, starting with frame k
  ii. calculate for $Fr_k$=(number of faces whose eyes are open in $Fr_k$+(0.5*number of faces whose eyes are partially open in $Fr_k$))/total number of faces in $Fr_k$.

The scoring module 204 applies the above eyes score algorithm to each frame in the merged segment, and assigns a resultant score to each frame. In this way, frames having eyes open are more likely to be selected for extraction.

Figure 9:
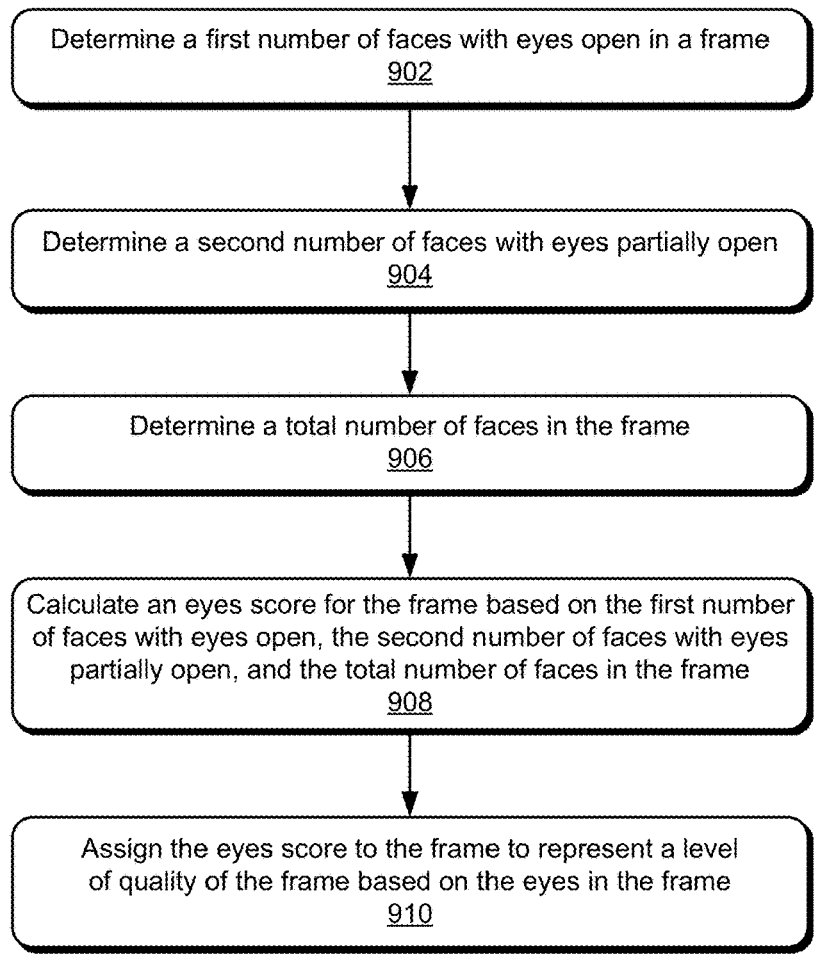
FIG. 9 depicts a flow diagram of an example procedure for scoring frames based on an eyes score algorithm in accordance with one or more embodiments.

FIG. 9 depicts a flow diagram of an example procedure 900 for scoring frames based on the eyes score algorithm in accordance with one or more embodiments. At 902, a first number of faces in the frame with eyes open is determined. For example, a facial recognition system can identify facial features by extracting various landmarks, or features, of a subject's face in an image, such as a video frame. The landmarks can include relative position, size and shape of the eyes of the face. Using these landmarks, the computing device can determine whether the eyes of a particular face are open, partially, open or closed, which in turn can be used to determine the number of faces with eyes open in the frame. At 904, a second number of faces in the frame with eyes partially open is determined. This second number of faces can be determined using the landmarks detected by the facial recognition system. At 906, a total number of faces in the frame is determined.

At 908, an eyes score is calculated for the frame based on the first number of faces with eyes open, the second number of faces with eyes partially open, and the total number of faces in the frame. In implementations, the eyes score can be calculated using the eyes score algorithm described above. Then, at 910, the eyes score is assigned to the frame to represent a level of quality of the frame based on the eyes in the frame. In this way, frames with a relatively higher eyes score are more likely to be selected for extraction from the video segment because such frames have relatively more subjects with eyes open, which is generally more desirable by users, particularly when capturing a group shot.

Figure 10:
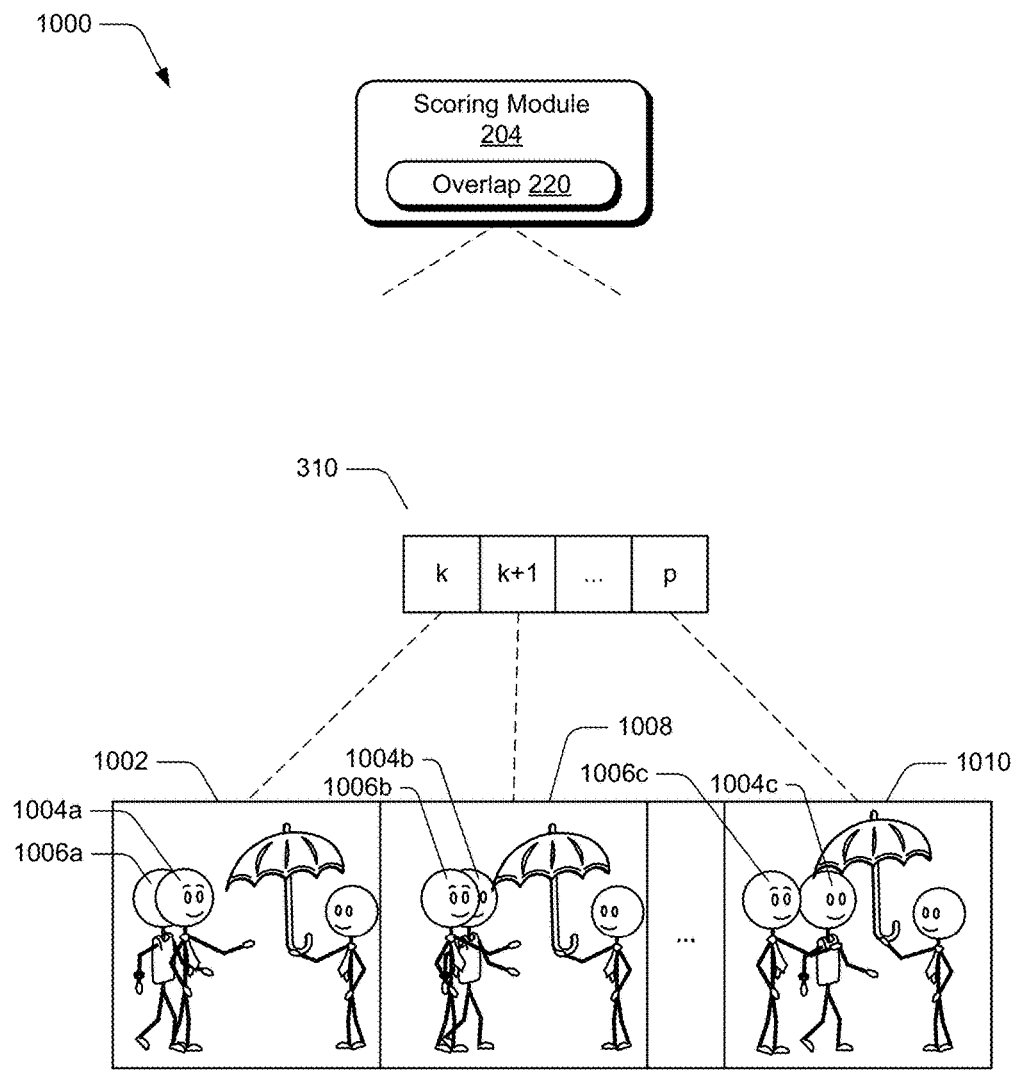
FIG. 10 illustrates an example implementation of the scoring module configured to score frames based on an overlap factor in accordance with one or more embodiments.

FIG. 10 illustrates an example implementation 1000 of the scoring module 204 scoring frames based on the overlap 220 factor in accordance with one or more embodiments. Because subjects in the video can move about during a video shoot, some scenarios include one or more faces being at least partially overlapped by another face or object. Frames having a face with partial or full overlap may not be desirable candidates for extraction because the overlapped face is obscured and not visible in the frame. In the illustrated example, frame 1002 includes three people with faces, but a face 1004a is overlapping (e.g., obscuring) a face 1006a such that the face 1006a is hidden from view. Thus, frame 1002 may not be desirable and is thus assigned lower relative score. In frame 1008, the face 1004b is less obscured by the face 1006b, but the face 1004b is only partially viewable, which is also not desirable. In frame 1010, however, the face 1004c is no longer being overlapped by face 1006c or any other face or object, and all faces in the frame 1010 are viewable. Thus, the scoring module 204 can assign frame 1010 a highest relative overlap score in comparison to the other frames 1002, 1008 in the merged segment 310 because the overlap of faces is minimized.

Facial overlap is automatically detected by the image extraction module 110 in each frame of a video segment. For partial overlap, a face detection engine is used to detect each face in the frame. Then, the image extraction module 110 detects whether the area of any face in the frame overlaps any other facial area in the frame. Using the areas of faces in the frames, partial overlap can be detected. In full overlap, however, the overlapped face is substantially hidden by another face, and is not likely to be detected by the face detection engine. In this scenario, both faces and their respective directions are tracked over a predefined number of previous frames and a predefined number of subsequent frames. Full overlap is detected if:

i. In the predefined number of previous frames, both faces generally create partial overlap cases and their area of overlap is increasing frame by frame until $Fr_k$
OR
 ii. In the predefined number of subsequent frames, both faces generally create partial overlap cases and their area of overlap is decreasing frame by frame as preceding away from $Fr_k$.

After detecting the number of partial overlaps and the number of full overlaps in frame $Fr_k$, then the overlap score for the frame is calculated as follows:

iii. ((Number of faces with no overlap+(0.5*Number of faces which are partially overlapped))/(Total number of faces in the frame $Fr_k$ (including the face(s) which are fully overlapped))

In this way, each frame is assigned a relative overlap score by the scoring module 204 based on whether the frame includes overlapped faces, some of which are detected relative to previous and/or subsequent frames in the merged segment.

Figure 11:
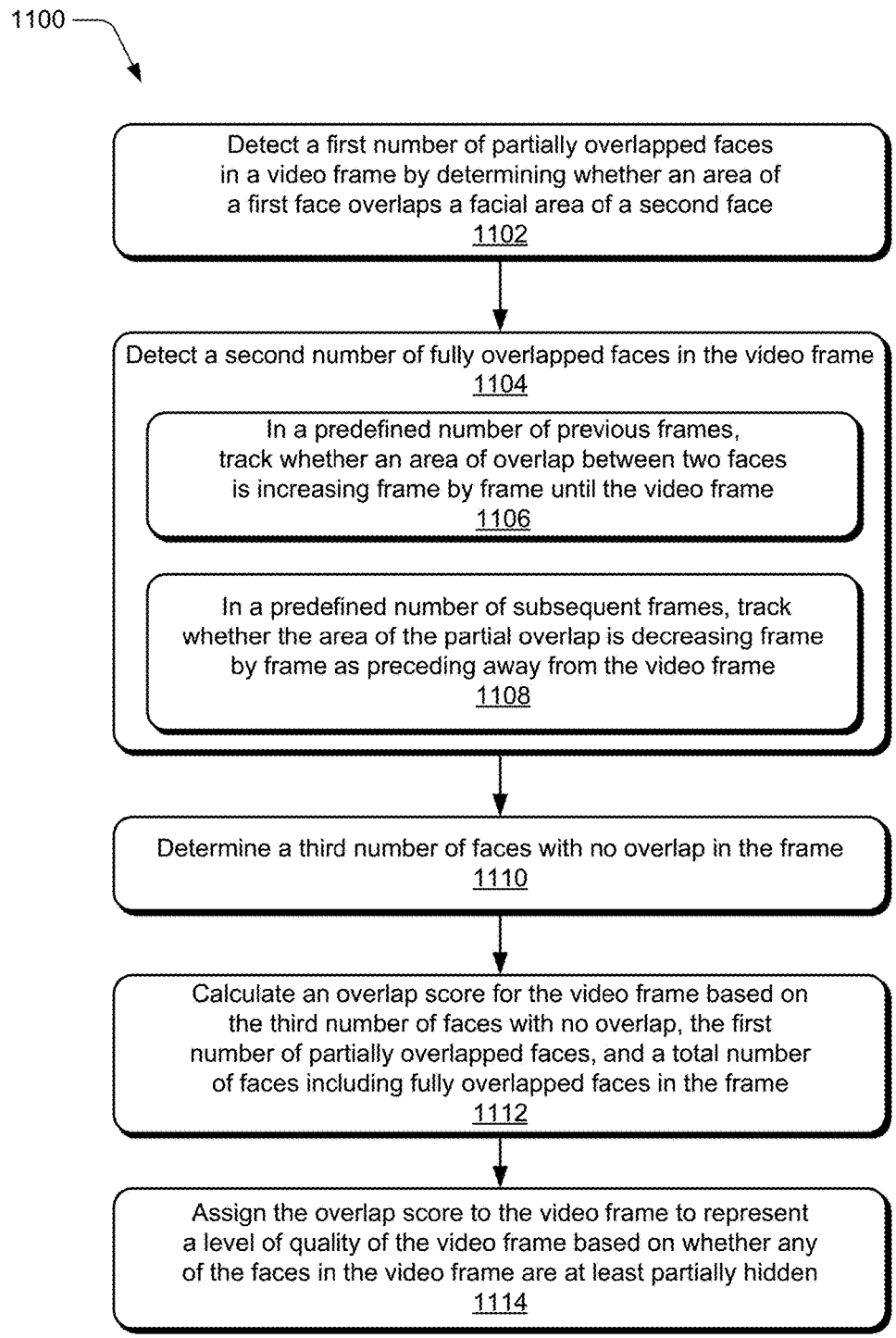
FIG. 11 depicts a flow diagram of an example procedure for scoring frames based on an overlap score algorithm in accordance with one or more embodiments

FIG. 11 depicts a flow diagram of an example procedure 1100 for scoring frames based on the overlap score algorithm in accordance with one or more embodiments. At 1102, a first number of partially overlapped faces in the frame is detected by determining whether an area of a first face overlaps a facial area of a second face. As discussed above, this first number is determined based on data obtained using the facial recognition system, which provides an area and a relative position of each face. At 1104, a second number of fully overlapped faces is detected in the frame. This second number is determined based on 1106 or 1108.

At 1106, an area of partial overlap between two faces is tracked over a predefined number of previous frames to determine whether the area of overlap is increasing frame by frame until reaching the video frame. If the area of overlap is increasing frame by frame as approaching the video frame, then the increasing area indicates one of the two faces is fully overlapped by the other of the two faces, and the overlapped face is moving behind the overlapping face in the video segment. If, however, the area of overlap is not increasing frame by frame as approaching the video frame, then there may not be an overlapped face at that location in the video frame.

At 1108, the area of the partial overlap is tracked to determine whether the area is decreasing frame by frame as preceding away from the video frame. If the area of overlap is decreasing frame by frame as preceding away from the video frame, then the decreasing area of overlap indicates that one of the two faces is fully overlapped in the video frame, and the overlapped face is emerging from behind the overlapping face as the video segment continues. If, however, the area of overlap is not decreasing frame by frame as preceding away from the video frame, then there may not be an overlapped face at that location in the video frame.

At 1110, a third number of faces with no overlap in the frame is determined. At 1112, an overlap score is calculated for the video frame based on the third number of faces with no overlap, the first number of partially overlapped faces, and a total number of faces including fully overlapped faces in the frame. Then, at 1114, the overlap score is assigned to the video frame to represent a level of quality of the video frame based on whether any of the faces in the video frame are at least partially hidden.

Figure 12:
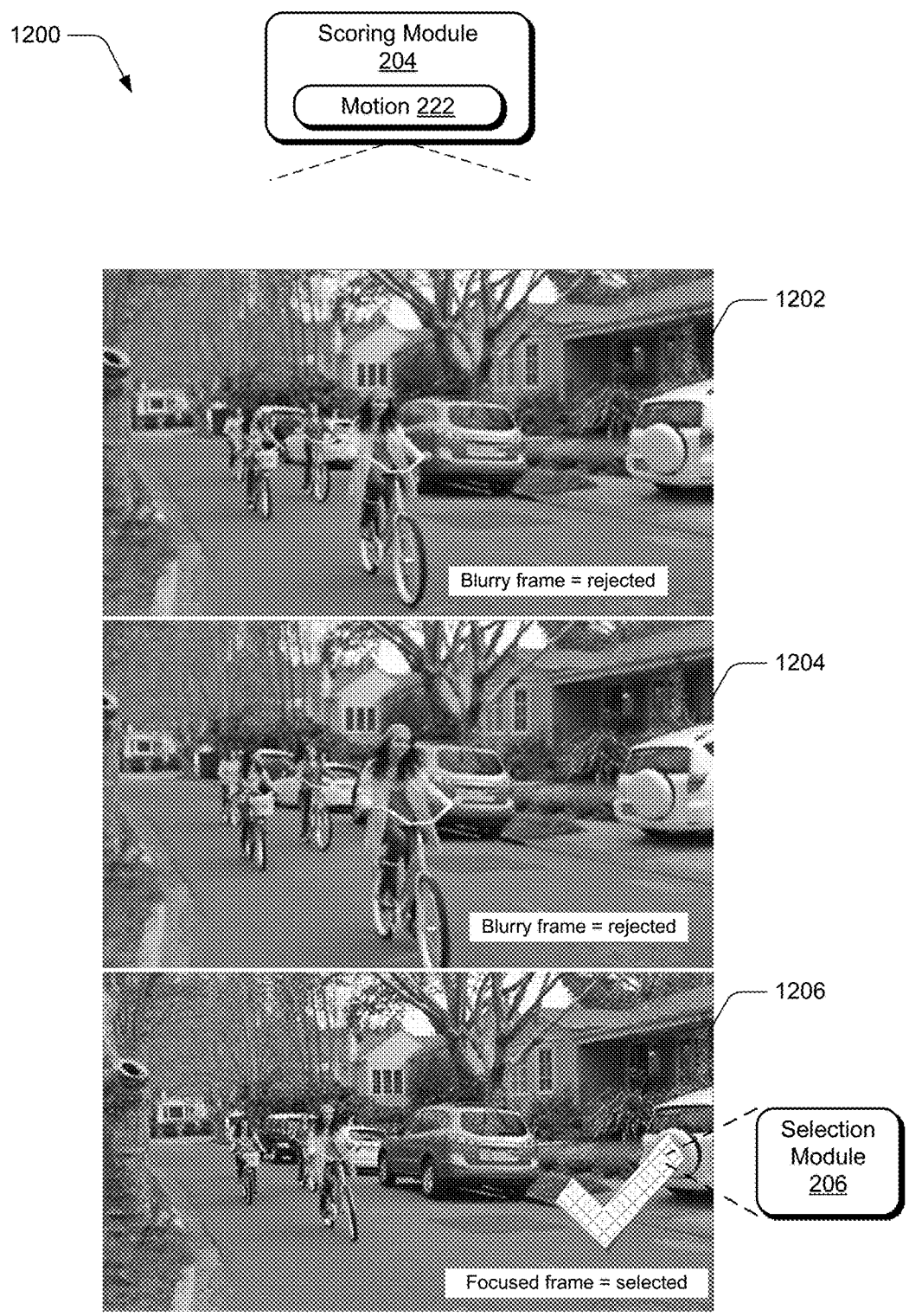
FIG. 12 illustrates and example implementation of the scoring module configured to score frames based on a motion factor in accordance with one or more embodiments.

FIG. 12 illustrates and example implementation 1200 of the scoring module 204 scoring frames based on the motion 222 factor in accordance with one or more embodiments. In at least some scenarios, a video segment having fast moving subjects can appear clear during playback of the video but individual frames can appear blurry or distorted. Thus, scoring the frames based on the motion 222 factor can improve the automatic image extraction technique by avoiding blurry frames.

In the illustrated example, frame 1202 is determined to be too blurry because of a high level of motion associated with the subjects riding bicycles in the frame 1202. Thus frame 1202 is assigned a low motion score and is thus rejected as a candidate for extraction. In addition, frame 1204 is also detected as including a high level of motion, and is thus rejected as a candidate for extraction because the level of blur is high. Frame 1206, however, has less blur and higher focus in comparison to frames 1202, 1204 because the level of motion is relatively lower. Thus, frame 1206 is selected by the selection module 206 as a candidate for extraction from the video.

To determine the motion score for each frame, the scoring module 204 categorizes different portions of the merged segment 310 based on different activity level of the content in the merged segment 310. For example, motion is detected in each frame of the merged segment 310 by using a point tracker algorithm. Any suitable point tracker algorithm can be utilized. The motion is segmented into different portions based on one or more threshold values, which are predefined values and can be improved with machine learning and user input. In at least one implementation, the different portions include a high activity portion, a medium activity portion, and a low activity portion. If the motion in a particular frame is low (e.g., the particular frame lies within a low activity portion), then it is highly likely that the particular frame includes a low level of blur and/or a high level of focus. If, for example, the motion in a portion of the merged segment 310 is high (e.g., camera is shaking, subject is running), then each frame in that portion is likely to have a relatively higher level of blur or distortion, which is not desirable.

Accordingly, the scoring module 204 assigns a motion score to each frame of the merged segment 310 based on a corresponding activity portion in which the frame is located. For example, if a frame is located within a high activity portion of the merged segment 310, then the frame is assigned a motion score of ⅓. Frames located within a medium activity portion are assigned a motion score of ⅔. Additionally, frames located within a low activity portion are scored with a one (1). Any number of additional activity portions can be utilized to further segment the level of motion in the merged segment 310 and refine the corresponding motion scores.

Figure 13:
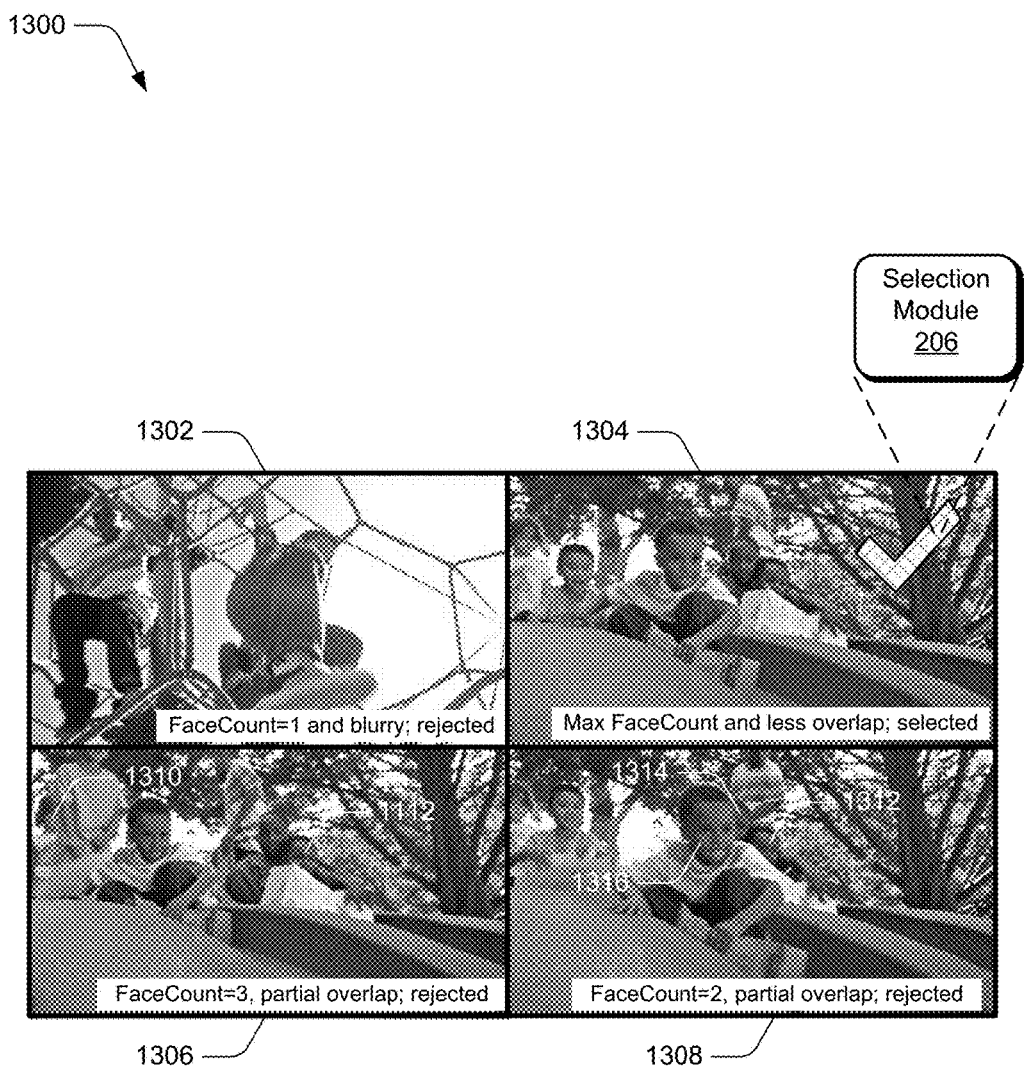
FIG. 13 illustrates an example implementation of frame selection for extraction from a video segment based on associated scores.

FIG. 13 illustrates an example implementation 1300 of frame selection for extraction from a video segment based on associated scores. For example, the example implementation 1300 includes sample frames 1302, 1304, 1306, and 1308 taken from a video segment of children playing on a playset. Frame 1302 is an example of a frame that has low face count in comparison to other frames in the video segment, and is determined to be too blurry based on a high level of motion in the frame 1302. Because of at least these factors, frame 1302 is rejected. Frame 1304 includes a maximum number of faces detected with little overlap, and a low blurriness based on a low level of motion. Thus, the frame 1304 is selected by the selection module 206 as a candidate for extraction. Frame 1306 includes a face count of three with a partial overlap of faces 1310, 1312, which results in the frame 1306 being rejected. In addition, frame 1308 includes a face count of two, which is less than other frames in the video segment, and also includes partial overlaps of faces 1314, 1312. Frame 1308 is zoomed in on face 1316 in front, but is rejected because of the other factors that result in low scores for the frame 1308.

Figure 14:
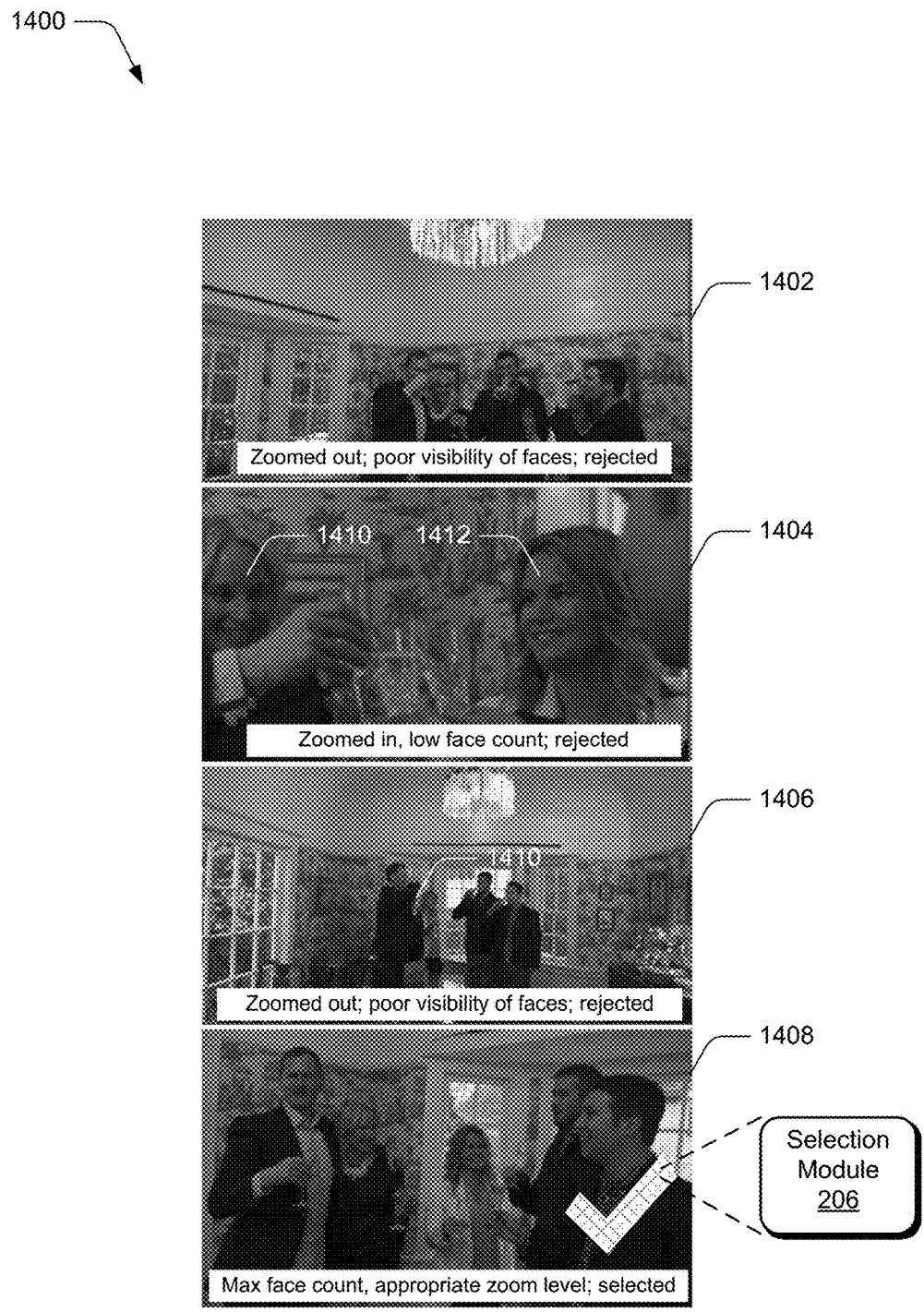
FIG. 14 illustrates an example implementation of frame selection for extraction from a video segment based on associated scores.

FIG. 14 illustrates an example implementation 1400 of frame selection for extraction from a video segment based on associated scores. For example, the example implementation 1400 includes sample frames 1402, 1404, 1406, and 1408 taken from a group of people at a social gathering. Frame 1402 is zoomed out to include an entire group of people, but visibility of individual faces is low. Thus, the frame 1402 is rejected. Frame 1404 is zoomed in on faces 1410, 1412, but excludes other faces from the group. Because the face count is low in comparison to the other frames in the video segment, the frame 1404 is rejected. Frame 1406 is rejected because, although it is zoomed out to capture the entire group, the visibility of the faces is low and face 1410 is overlapped such that it is completely hidden.

Frame 1408 includes a maximum face count, less blurriness, and less divergence, in comparison to the other frames. The divergence refers to differences in orientations of each face in the frame. A low divergence indicates that all the faces in the frame are facing a similar direction, such as toward the camera, which is generally desirable in group shots. A high divergence indicates that different faces are facing in different directions. Such a scenario may be desirable when the subjects are posing in particular positions. For example, one person's face or head may be facing upwards while another person's face or head is facing downwards. In implementations, a divergence above a predefined value can indicate that the people are intentionally standing in particular positions for the group shot. Accordingly, the frame is assigned an orientation score by the scoring module 204 based on the orientation 224 or the divergence in orientation 224. In addition, the frame 1408 includes an appropriate zoom level, and the faces in the frame 1408 are smiling and have eyes open. Accordingly, the frame 1408 is selected by the selection module 206 as a candidate for extraction from the video.

Example Procedure

The following discussion describes techniques for extracting high quality candid images from videos that may be implemented utilizing the previously described systems and devices. Generally, any of the components, modules, methods, and operations described herein can be implemented using hardware (e.g., fixed logic circuitry), firmware, software, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 15:
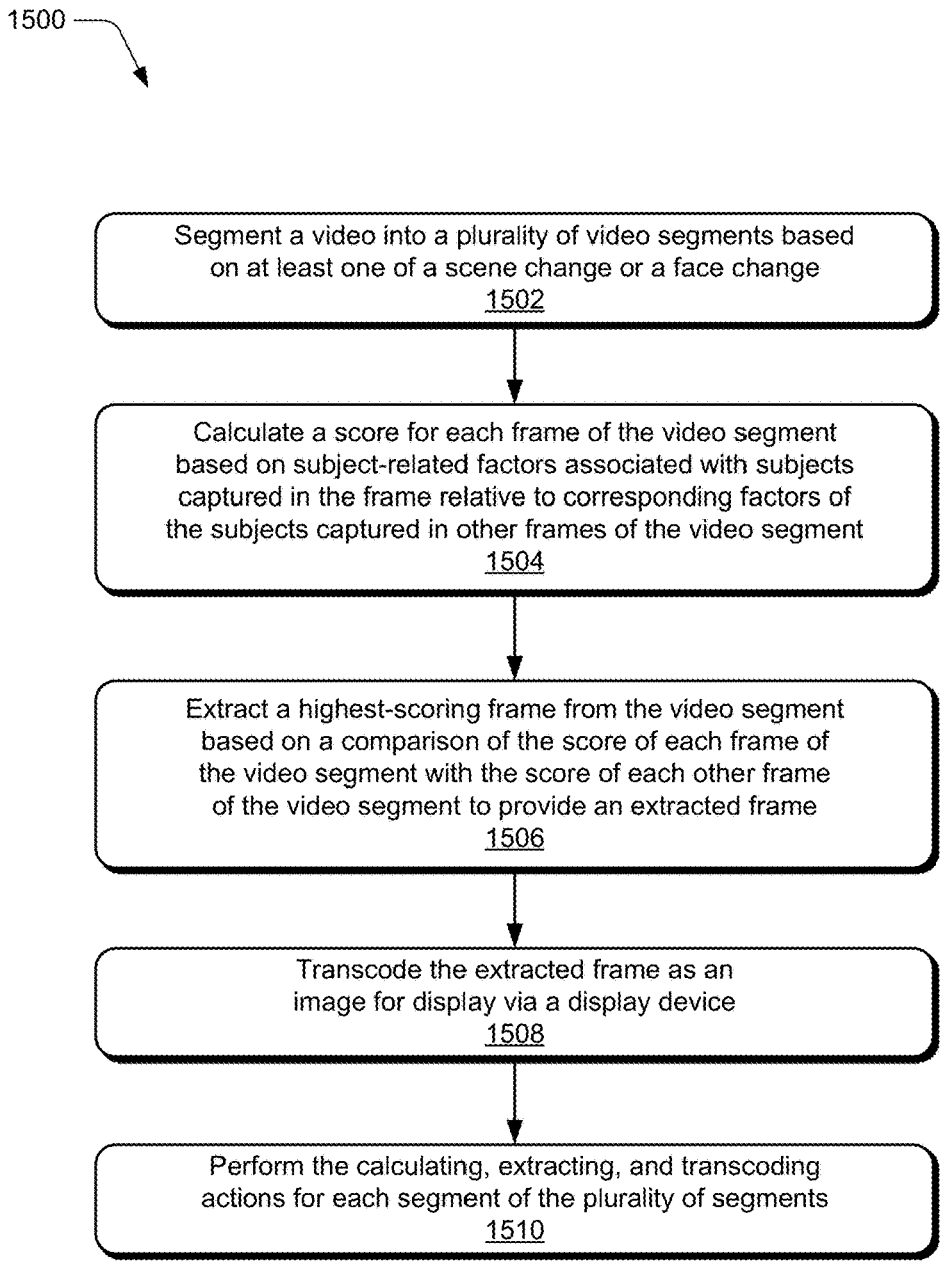
FIG. 15 describes an example procedure for extracting high quality images from videos in accordance with one or more embodiments.

FIG. 15 describes an example procedure 1500 for an improved image extraction method to extract high quality images from videos. The procedures are shown as a set of blocks that specify operations performed by one or more devices and are not necessarily limited to the orders shown for performing the operations by the respective blocks. In at least some implementations the procedures may be performed in a digital medium environment by a suitably configured device, such as the example computing device 102 of FIG. 1.

At 1502, a video is segmented into a plurality of video segments based on at least one of a scene change or a face change. This can be performed in any suitable way, examples of which are described above. Each video segment is then analyzed to identify one frame within the video segment to extract and transcode as a high quality image.

At 1504, a score is calculated for each frame of the video segment based on a variety of different subject-related factors associated with subjects captured in the frame relative to corresponding factors of the subjects captured in other frames of the video segment. The subject-related factors include a variety of factors associated with the subject, such as a level of zoom on the subject, alignment of multiple subjects in the frame, whether the subject's eyes are open, overlap of one subject over another, a level of motion within the frame corresponding to a level of blur, divergence of orientation of faces in the frame, whether the faces are smiling, and so on. These and other factors are described in more detail above.

At 1506, a highest-scoring frame from the video segment is extracted based on a comparison of the score of each frame of the video segment with the score of each other frame of the video segment to provide an extracted frame. The highest-scoring frame represents a "best" frame or highest relative quality frame of the video segment. For instance, among all the frames in the video segment, the highest-scoring frame may be a frame that is well-focused, appropriately zoomed, and has subjects that are aligned for a group shot with their eyes open and with minimal overlap between the subjects. At 1508, the extracted frame is transcoded as an image for display via a display device. At 1510, the calculating, extracting, and transcoding actions are performed for each segment of the plurality of segments. In this way, a best high quality image is extracted from each video segment of the video. This provides a plurality of high quality images, that are each extracted from a different portion of the video.

Figure 16:
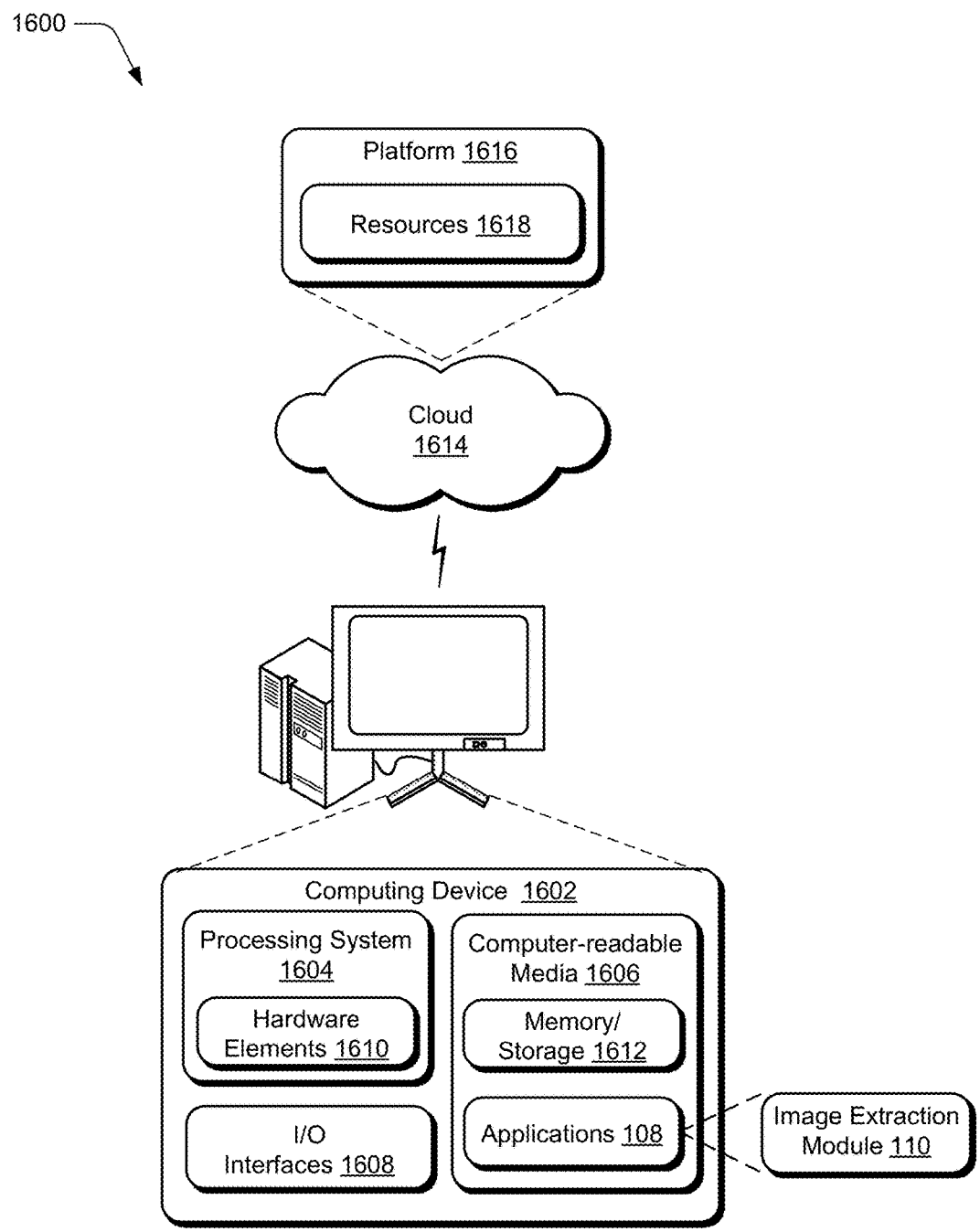
FIG. 16 illustrates an example system including various components of an example device that can be employed for one or more search implementations described herein.

The above-described method constitutes an improvement over current approaches which use a primarily manual approach to extract images from videos. The automated nature of the described embodiments provides a fast, efficient and easily scalable solution. That is, through the use of automated rules of the particular types discussed herein, high quality images can be more quickly and efficiently extracted and provided to end users. For example, in scenarios in which people are gathered for a group photograph and a user captures the group by recording video, the automated process can allow for quick and easy selection and extraction of high quality images from the video for upload to a social media site. As discussed above, a best high quality image is extracted from each different segment of the video. This would be difficult if not impossible if the operations were to be performed manually because manually identifying high quality images from videos is a slow and arduous process. Moreover, the automated rules promote scalability by removing the need for human intervention, such as adding additional humans to perform the arduous manual process Example System and Device FIG. 16 illustrates an example system generally at 1600 that includes an example computing device 1602 that is representative of one or more computing systems and/or devices that may implement the various techniques described herein. This is illustrated through inclusion of the applications 108 and, in particular, the image extraction module 110, which operates as described above. The computing device 1602 may be, for example, a server of a service provider, a device associated with a client (e.g., a client device), an on-chip system, and/or any other suitable computing device or computing system.

The example computing device 1602 is illustrated as including a processing system 1604, one or more computer-readable storage media 1606, and one or more I/O interfaces 1608 that are communicatively coupled, one to another. Although not shown, the computing device 1602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1604 is representative of functionality to perform one or more operations using hardware. Accordingly, the processing system 1604 is illustrated as including hardware elements 1610 that may be configured as processors, functional blocks, and so forth. This may include implementation in hardware as an application specific integrated circuit or other logic device formed using one or more semiconductors. The hardware elements 1610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1606 is illustrated as including memory/storage 1612. The memory/storage 1612 represents memory/storage capacity associated with one or more computer-readable media. The memory/storage component 1612 may include volatile media (such as random access memory (RAM)) and/or nonvolatile media (such as read only memory (ROM), Flash memory, optical disks, magnetic disks, and so forth). The memory/storage component 1612 may include fixed media (e.g., RAM, ROM, a fixed hard drive, and so on) as well as removable media (e.g., Flash memory, a removable hard drive, an optical disc, and so forth). The computer-readable storage media 1606 may be configured in a variety of other ways as further described below.

Input/output interface(s) 1608 are representative of functionality to allow a user to enter commands and information to computing device 1602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1602 may be configured in a variety of ways as further described below to support user interaction.

Various techniques may be described herein in the general context of software, hardware elements, or program modules. Generally, such modules include routines, programs, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1602. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1610 and computer-readable storage media 1606 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1610. The computing device 1602 may be configured to implement particular instructions and/or functions corresponding to the software and/or hardware modules. Accordingly, implementation of a module that is executable by the computing device 1602 as software may be achieved at least partially in hardware, e.g., through use of computer-readable storage media and/or hardware elements 1610 of the processing system 1604. The instructions and/or functions may be executable/operable by one or more articles of manufacture (for example, one or more computing devices 1602 and/or processing systems 1604) to implement techniques, modules, and examples described herein.

The techniques described herein may be supported by various configurations of the computing device 1602 and are not limited to the specific examples of the techniques described herein. This functionality may also be implemented all or in part through use of a distributed system, such as over a "cloud" 1614 via a platform 1616 as described below.

The cloud 1614 includes and/or is representative of a platform 1616 for resources 1618. The platform 1616 abstracts underlying functionality of hardware (e.g., servers) and software resources of the cloud 1614. The resources may include applications and/or data that can be utilized while computer processing is executed on servers that are remote from the computing device 1602. Resources can also include services provided over the Internet and/or through a subscriber network, such as a cellular or Wi-Fi network.

The platform 1616 may abstract resources and functions to connect the computing device 1602 with other computing devices. The platform 1616 may also serve to abstract scaling of resources to provide a corresponding level of scale to encountered demand for the resources that are implemented via the platform 1616. Accordingly, in an interconnected device implementation, implementation of functionality described herein may be distributed throughout the system 1600. For example, the functionality may be implemented in part on the computing device 1602 as well as via the platform 1616 that abstracts the functionality of the cloud 1614.

CONCLUSION

Various embodiments calculate a score for each frame of a video segment based on a plurality of subject-related factors associated with a subject captured in the frame relative to corresponding factors of the subject in other frames of the video segment. A highest-scoring frame from the video segment is then extracted based on a comparison of the score of each frame of the video segment with the score of each other frame of the video segment. Then, the extracted frame is transcoded as an image for display via a display device. The score calculation, extraction, and transcoding actions are performed automatically and without user intervention, which improves previous approaches that use a primarily manual, tedious, and time consuming approach.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment including at least one computing device that supports image extraction from a video, an improved image extraction method comprising:
    comparing, by the at least one computing device, each frame of a video segment to other frames of the video segment based on a plurality of subject-related factors associated with at least one subject captured in a frame of the video segment relative to corresponding factors of the at least one subject captured in the other frames of the video segment;
    calculating, by the at least one computing device and without user intervention, a score for each frame of the video segment based on the comparing, the score representing an overall level of image quality of the frame relative to the other frames in the video segment;
    automatically extracting, by the at least one computing device and without user intervention, a highest-scoring frame from the video segment based on a comparison of the score of each frame of the video segment to the score of each other frame of the video segment to provide an extracted frame; and
    transcoding, by the at least one computing device and without user intervention, the extracted frame as an image for display via a display device.

2. A method as described in claim 1, further comprising:
    segmenting the video into a plurality of video segments based on at least one of a scene change or a face change; and
    performing the comparing, calculating, automatically extracting, and transcoding actions for each video segment of the plurality of video segments.

3. A method as described in claim 1, wherein the at least one subject includes multiple objects, and the plurality of subject-related factors include a zoom factor indicating whether a magnification level is changed to exclude at least one of the multiple objects in the frame or to include at least one additional object.

4. A method as described in claim 1, wherein the at least one subject includes multiple objects, and the plurality of subject-related factors includes an alignment factor representing a variance of distances between the multiple objects in the frame.

5. A method as described in claim 1, wherein the plurality of subject-related factors includes an eyes factor indicating whether the at least one subject has eyes open, closed, or partially open.

6. A method as described in claim 1, wherein the at least one subject includes multiple faces, and the plurality of subject-related factors includes an overlap factor indicating whether a first face of the multiple faces is at least partially obscured by a second face of the multiple faces in the frame.

7. A method as described in claim 1, wherein the plurality of subject-related factors includes a motion factor representing a level of motion associated with the at least one subject in the frame, the level of motion indicating an amount of image blur in the frame.

8. A method as described in claim 1, wherein the at least one subject includes multiple objects, and the plurality of subject-related factors includes an orientation factor indicating a measure of divergence between orientations of the multiple objects in the frame.

9. In a digital medium environment that supports automatic extraction of images from a video, a system comprising an image extraction module implemented at least partially in hardware of a computing device, the image extraction module configured to:
  divide the video into a plurality of video segments based on at least one of scene changes, face changes, or object changes;
  responsive to the video being divided into the plurality of video segments:
    compare each frame of a respective video segment of the plurality of video segments to other frames of the respective video segment based on a plurality of subject-related factors of a subject captured in a frame of the respective video segment relative to corresponding factors of the subject captured in the other frames of the respective video segment; and
    automatically assign a score for each frame of the respective video segment based on the comparing, the score representing a level of image quality of the frame relative to other frames in the respective video segment;
  automatically extract one frame from the respective video segment based on the score of the one frame relative to scores assigned to the other frames in the respective video segment; and
  automatically generate an image for display by at least transcoding the one frame as the image for display via a display device.

10. A system as described in claim 9, wherein the subject includes multiple objects, and the plurality of subject-related factors include a zoom factor indicating whether a magnification level is being changed to exclude at least one of the multiple objects in the frame or to include at least one additional object.

11. A system as described in claim 9, wherein the subject includes multiple objects, and the plurality of subject-related factors include an alignment factor representing a variance of distances between the multiple objects in the frame.

12. A system as described in claim 9, wherein the plurality of subject-related factors includes an eyes factor indicating whether the subject has eyes open, closed, or partially open.

13. A system as described in claim 9, wherein the subject includes a group of faces, and the plurality of subject-related factors include an overlap factor indicating whether a first face from the group of faces is at least partially obscured by a second face from the group of faces in the frame.

14. A system as described in claim 9, wherein the plurality of subject-related factors includes a motion factor representing a level of motion associated with the subject in the frame, the level of motion corresponding to an amount of image blur in the frame.

15. A system as described in claim 9, wherein the subject includes multiple objects, and the plurality of subject-related factors include an orientation factor indicating a measure of divergence between orientations of the multiple objects in the frame.

16. In a digital medium environment that supports image extraction from a video, a method comprising:
  steps for comparing each frame of a video segment based on one or more factors associated with a subject captured in a frame of the video segment relative to one or more corresponding factors for the subject captured in other frames of the video segment;
  steps for determining a plurality of scores for each frame of a video segment, each score of the plurality of scores corresponding to a level of image quality based on the comparing;
  steps for calculating an overall score for each frame in the video segment based on the plurality of scores for the frame, the overall score having a value representing an overall level of image quality of the frame;
  steps for extracting one frame from the video segment based on the overall score of the one frame;
  steps for generating an image from the video by at least transcoding the one frame as the image; and
  steps for initiating a display of the image via a display device.

17. A method as described in claim 16, further comprising steps for dividing the video into a plurality of video segments including the video segment, the video divided based on at least one a scene change, a change in a number of faces in a scene, or a change in a number of objects in the scene.

18. A method as described in claim 16, wherein the one or more factors associated with the subject captured in the frame include at least one of:
  a zoom factor indicating whether a magnification level is being changed from the frame to a next frame in the video segment; or
  a motion factor representing a level of activity associated with the subject in the frame.

19. A method as described in claim 16, wherein the subject includes a group of faces, and wherein the one or more factors include at least one of:
  an alignment factor representing a variance of distances between the faces in the frame;
  an eyes factor indicating whether each of the faces has eyes open; or
  an overlap factor indicating whether a first face from the group of faces is at least partially obscured by a second face from the group of faces in the frame.

20. A method as described in claim 16, wherein the extracted one frame includes a highest relative overall score for the video segment and represents a highest relative overall level of image quality of the frame in comparison to other frames in the video segment.

* * * * *